United States Patent [19]
Hopkins et al.

[11] Patent Number: 6,103,120
[45] Date of Patent: *Aug. 15, 2000

[54] FLUID PROCESSING APPARATUS

[75] Inventors: Scott D. Hopkins, Dryden; Stephen A. Geibel, Cortland; Timothy P. Pierce, Syracuse; Kenneth M. Williamson, Jamesville, all of N.Y.; Atsushi Sakamoto; Hajime Hiranaga, both of Ibaraki, Japan

[73] Assignee: Pall Corporation, East Hills, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,779

[22] PCT Filed: Oct. 23, 1995

[86] PCT No.: PCT/US95/13742

§ 371 Date: Aug. 26, 1997

§ 102(e) Date: Aug. 26, 1997

[87] PCT Pub. No.: WO96/12547

PCT Pub. Date: May 2, 1996

Related U.S. Application Data

[63] Continuation-in-part of application No. 08/325,163, filed as application No. PCT/US95/13742, Oct. 23, 1995.

[51] Int. Cl.[7] .................................................... B01D 29/07

[52] U.S. Cl. .................... 210/497.1; 210/497.01; 210/493.1; 210/493.2; 210/493 S; 210/494.4; 55/498; 55/499; 55/500; 55/501

[58] Field of Search ............................ 210/497.1, 497.01, 210/494.1, 493.5, 493.1, 493.2; 55/498, 499, 500, 501

[56] References Cited

U.S. PATENT DOCUMENTS

| | | |
|---|---|---|
| Re. 31,912 | 6/1985 | Fortuna et al. . |
| 360,441 | 4/1887 | Howes . |
| 629,377 | 7/1899 | Leland . |
| 1,175,948 | 3/1916 | French . |
| 1,669,461 | 5/1928 | Gamble . |
| 2,145,535 | 1/1939 | Vokes . |
| 2,331,332 | 10/1943 | Latta . |
| 2,395,449 | 2/1946 | Briggs . |
| 2,420,414 | 5/1947 | Briggs . |
| 2,537,992 | 1/1951 | Gross et al. . |

(List continued on next page.)

FOREIGN PATENT DOCUMENTS

| | | |
|---|---|---|
| 824484 | 10/1969 | Canada . |
| 92305748 | 12/1992 | European Pat. Off. . |
| 0605018 | 7/1994 | European Pat. Off. . |
| 2800425 | 7/1979 | Germany . |
| 29 40144 | 4/1981 | Germany . |
| 3429634 | 2/1986 | Germany . |
| 3606993 | 9/1987 | Germany . |
| 3837423 | 5/1990 | Germany . |
| 45-30398 | 10/1970 | Japan . |
| 53-5075 | 1/1978 | Japan . |
| 61-61012 | 4/1986 | Japan . |
| 61-227809 | 10/1986 | Japan . |
| 62-273008 | 11/1987 | Japan . |
| 63-65908 | 3/1988 | Japan . |
| 1171607 | 7/1989 | Japan . |
| 4122614 | 11/1992 | Japan . |
| 5345357 | 12/1993 | Japan . |
| 841818 | 7/1960 | United Kingdom . |
| 1003164 | 9/1965 | United Kingdom . |
| 1201156 | 8/1970 | United Kingdom . |
| 1400147 | 7/1975 | United Kingdom . |
| 2230472 | 10/1990 | United Kingdom . |
| WO 84/04050 | 10/1984 | WIPO . |
| 9421362 | 9/1994 | WIPO . |
| WO 95/10346 | 4/1995 | WIPO . |

*Primary Examiner*—David A. Reifsnyder
*Attorney, Agent, or Firm*—Leydig, Voit & Mayer, Ltd.

[57] ABSTRACT

An apparatus for use in processing fluids includes a tubular porous element, a housing disposed about the porous element, and grooves and passages disposed between the housing and the porous element.

17 Claims, 13 Drawing Sheets

U.S. PATENT DOCUMENTS

| | | |
|---|---|---|
| 2,586,078 | 2/1952 | O'Malley . |
| 2,600,150 | 6/1952 | Abendroth . |
| 2,689,652 | 9/1954 | Gretzinger . |
| 2,759,610 | 8/1956 | James . |
| 2,801,009 | 7/1957 | Bowers . |
| 2,979,209 | 4/1961 | Nolden . |
| 3,002,870 | 10/1961 | Belgarde et al. . |
| 3,054,507 | 9/1962 | Humbert, Jr. et al. . |
| 3,122,501 | 2/1964 | Hultgren . |
| 3,174,625 | 3/1965 | Briggs . |
| 3,241,680 | 3/1966 | Humbert, Jr. . |
| 3,244,574 | 4/1966 | Decker et al. . |
| 3,314,546 | 4/1967 | Briggs . |
| 3,317,043 | 5/1967 | Vanderpoel . |
| 3,389,797 | 6/1968 | Giardini . |
| 3,392,843 | 7/1968 | Mumby . |
| 3,438,825 | 4/1969 | Fidler . |
| 3,499,068 | 3/1970 | Brown . |
| 3,501,013 | 3/1970 | Madsen . |
| 3,503,511 | 3/1970 | Spitzberg . |
| 3,547,719 | 12/1970 | Kasten . |
| 3,696,932 | 10/1972 | Rosenberg . |
| 3,719,983 | 3/1973 | Funk et al. . |
| 3,769,128 | 10/1973 | Manjikian . |
| 3,813,334 | 5/1974 | Bray . |
| 3,850,813 | 11/1974 | Pall et al. . |
| 3,902,858 | 9/1975 | Chernykh . |
| 3,920,553 | 11/1975 | Cliento . |
| 3,932,153 | 1/1976 | Byrns . |
| 3,982,980 | 9/1976 | van Manen . |
| 4,062,781 | 12/1977 | Strauss et al. . |
| 4,069,091 | 1/1978 | van Manen . |
| 4,148,732 | 4/1979 | Burrow et al. . |
| 4,206,050 | 6/1980 | Walch et al. . |
| 4,218,324 | 8/1980 | Hartmann et al. . |
| 4,353,761 | 10/1982 | Woerz et al. . |
| 4,386,999 | 6/1983 | Fortuna et al. . |
| 4,402,830 | 9/1983 | Pall . |
| 4,447,327 | 5/1984 | Clark . |
| 4,457,795 | 7/1984 | Mason et al. . |
| 4,500,426 | 2/1985 | Ishii et al. . |
| 4,517,090 | 5/1985 | Kersten et al. . |
| 4,522,719 | 6/1985 | Kuwajima et al. . |
| 4,547,289 | 10/1985 | Okano et al. . |
| 4,552,612 | 11/1985 | Fortuna et al. . |
| 4,721,546 | 1/1988 | Clark et al. . |
| 4,741,788 | 5/1988 | Clark et al. . |
| 4,743,331 | 5/1988 | Nuttall et al. . |
| 4,758,392 | 7/1988 | Collins et al. . |
| 4,784,709 | 11/1988 | Unger et al. . |
| 4,786,298 | 11/1988 | Billiet et al. . |
| 4,828,698 | 5/1989 | Jewell et al. . |
| 4,839,037 | 6/1989 | Bertelsen et al. . |
| 4,839,048 | 6/1989 | Reed et al. . |
| 4,855,058 | 8/1989 | Holland et al. . |
| 4,872,990 | 10/1989 | Van Wijk . |
| 4,929,354 | 5/1990 | Meyering et al. . |
| 4,956,089 | 9/1990 | Hurst . |
| 4,963,260 | 10/1990 | Naoi et al. . |
| 5,064,485 | 11/1991 | Smith et al. . |
| 5,096,591 | 3/1992 | Benn . |
| 5,128,039 | 7/1992 | Gabrielson . |
| 5,130,023 | 7/1992 | Feint . |
| 5,147,541 | 9/1992 | McDermott, Jr. et al. . |
| 5,174,896 | 12/1992 | Harms, II . |
| 5,178,753 | 1/1993 | Trabold . |
| 5,198,107 | 3/1993 | Ponce ........................................ 210/338 |
| 5,252,207 | 10/1993 | Miller et al. . |
| 5,256,285 | 10/1993 | Tomita et al. . |
| 5,275,743 | 1/1994 | Miller et al. . |
| 5,277,807 | 1/1994 | Lavoie et al. . |
| 5,290,445 | 3/1994 | Buttery . |
| 5,403,482 | 4/1995 | Steere et al. . |
| 5,462,675 | 10/1995 | Hopkins et al. . |
| 5,472,606 | 12/1995 | Steere et al. . |
| 5,543,047 | 8/1996 | Stoyell et al. . |
| 5,575,904 | 11/1996 | Suzuki ............................. 210/497.01 |
| 5,620,599 | 4/1997 | Hopkins . |
| 5,647,950 | 7/1997 | Reed et al. . |

EXPONENTIALLY INCREASING $\Delta P$

LINEARLY INCREASING $\Delta P$

EXPONENTIALLY INCREASING GROOVE AREA

ΔP

DISTANCE FROM INLET

CONSTANT ΔP

1

FLUID PROCESSING APPARATUS

This application is a national phase application of International Application PCT/US95/13742, filed Oct. 23, 1995, which application designated the United States of America, and International Application PCT/US95/13742 was a continuation-in-part application of U.S. application Ser. No. 08/325,163, filed Oct. 21, 1994, now abandoned.

TECHNICAL FIELD

The present invention relates to a fluid processing apparatus, and more particularly, to a filter assembly including, for example, a cylindrical, cartridge-type filter assembly.

BACKGROUND ART

A typical cylindrical, cartridge-type fluid processing apparatus may comprise a hollow, generally cylindrical, permeable filter cartridge disposed within a housing. The housing typically includes two or more portions which are joined together about the filter cartridge. In conventional embodiments, the filter cartridge is pre-assembled to include a cage about the exterior, a core disposed on the interior, a tubular porous element disposed between the core and the cage, and first and second end caps holding the core, cage, and porous element together. The end-caps may be sealed to the ends of the porous element using an adhesive, welding, or a annular knife-edge which penetrates into the porous element. The housing may then be sealed to the end caps using, for example, one or more resilient O-rings. Typically, the housing includes a seat mechanism to compress the O-ring seals.

A problem arises with conventional cartridge-type fluid processing apparatuses in that a large number of components and manufacturing steps are required which increases the cost and reduces the overall reliability of the fluid processing apparatus. Further, conventional cartridge-type filters may have impurities from an adhesive or O-ring seal leach into the filtrate. This can be particularly serious when filtering fluids used in a semiconductor manufacturing process. Additionally, with some configurations and applied pressures, the filter cartridge may distend, distort, rupture, or even burst, thereby reducing the efficiency and/or reliability of the filter.

Additionally, a potentially costly problem associated with the use of any filter assembly is the problem of hold-up volume waste. When a filter element must be replaced, typically during routine maintenance, a portion of the fluid remains within the filter element housing. The remaining fluid generally cannot be reused due to possible contamination; therefore, this excess fluid must be disposed of, and depending upon the fluid, the replacement of the fluid can be costly. For example, in the integrated circuit industry, photo lithography is a technique utilized in various mask work procedures. Photoresist is a light sensitive chemical mixture which is used in photo lithography. In the photo lithography procedure, the photoresist is pumped onto a spinning disc which spreads the viscous photoresist over the particular work product. The pump assembly utilized has a filter housing that accepts a small disposable filter which must be replaced periodically and excess photoresist in the filter housing is lost. A typical positive photoresist can cost up to six hundred dollars or more per gallon, making waste extremely costly. In addition to the direct cost of replacing the wasted fluid, there is the cost of disposal. There are environmental factors which need to be considered in the disposal of certain chemicals, thereby making disposal as potentially costly as buying new chemicals.

DISCLOSURE OF THE INVENTION

It is an advantage of the invention to solve the above mentioned problems by providing a new, simple, and easy to manufacture filter cartridge. Other advantages of the present invention include: assembling the filter apparatus in a single manufacturing step, eliminating the need for filter end caps, O-ring seals, assembling a cartridge-type fluid processing apparatus from only four pieces having three unique parts: e.g., a housing, a porous element, and two identical endpieces, preventing impurities from entering the filtrate by including rounded corners and welded bonds, minimizing the overall housing size for a given porous element, reducing the hold-up volume while maintaining acceptable differential pressures across the porous element, and increasing the surface area of the porous element within a given housing volume.

In accordance with one aspect of the present invention, an improved fluid processing apparatus may include a tubular porous element having interior and exterior surfaces extending between first and second ends and a housing including a tubular portion extending between first and second ends and disposed about the tubular porous element.

In accordance with another aspect of the invention, an apparatus for use in processing fluids comprises a tubular porous element, a housing and a plurality of fluid flow grooves and passages. The tubular porous element has first and second ends and interior and exterior surfaces extending between the first and second ends. The housing includes an inlet and an outlet and defines a fluid flow path between the inlet and the outlet. The tubular porous element is disposed across the fluid flow path. The housing includes a tubular housing portion and first and second housing end pieces. The tubular housing portion has first and second ends and an interior surface disposed about the tubular porous element. The first and second housing end pieces are respectively sealed to both the first and second ends of the tubular housing portion and the first and second ends of the tubular porous element. The plurality of fluid flow grooves or passages are disposed between the housing and the porous element and extend about the first end to about the second end of the porous element.

In accordance with still another aspect of the invention, an apparatus for use in processing fluids comprises a tubular porous element having first and second ends, a housing disposed about the tubular porous element, fluid flow grooves or passages disposed between the tubular porous element and the housing. The fluid flow grooves and passages extend substantially between the first and second ends of the tubular porous element. The fluid flow grooves or passages are tapered such that the grooves or passages increase in cross section in the direction of fluid flow.

In accordance with a further aspect of the invention, an apparatus for use in processing fluids comprises a tubular porous element, a housing having a tubular portion and first and second ends, a plurality of fluid flow grooves or passages, and first and second end pieces. The tubular porous element includes first and second ends and a plurality of longitudinally extending pleats extending between the first and second ends. The tubular porous element has an inner diameter d and an outer diameter D, wherein each of the pleats has a height greater than $(D-d)/2$. The housing extends between first and second ends of the tubular porous element and is disposed about the tubular porous element.

The plurality of fluid flow grooves or passages extend between the first and second ends of the tubular porous element and are disposed between the housing and the tubular porous element. The first end piece is sealed directly to the housing and to the tubular porous element at the respective first ends, and the second end piece is sealed directly to the housing and to the tubular porous element at the respective second ends.

Embodiments of the present invention thus have an entirely different construction than the conventional cartridge type filtering devices. The present invention in intended to cover one or more aspects of the following described embodiments in any combination or subcombination.

BRIEF DESCRIPTION OF THE DRAWINGS

In the accompanying drawings:

FIGS. 5b and 5c are sectioned views of exemplary housings for use with the embodiment of the fluid treatment assembly shown in FIG. 5a;

FIG. 20a shows a fluid flow groove having a constant cross-sectional area along the direction of fluid flow and FIG. 20b show a graph of the pressure variation from the inlet to the outlet for the fluid flow grooves of FIG. 20a;

FIG. 21a shows a fluid flow groove having a linearly increasing cross-sectional area along the direction of fluid flow and FIG. 21b show a graph of the pressure variation from the inlet to the outlet for the fluid flow grooves of FIG. 21a; and FIG. 22a shows a fluid flow groove having a linearly increasing cross-sectional area along the direction of fluid flow and FIG. 22b show a graph of the pressure variation from the inlet to the outlet for the fluid flow grooves of FIG. 22a.

DETAILED DESCRIPTION OF PREFERRED EMBODIMENTS

Figure 1:
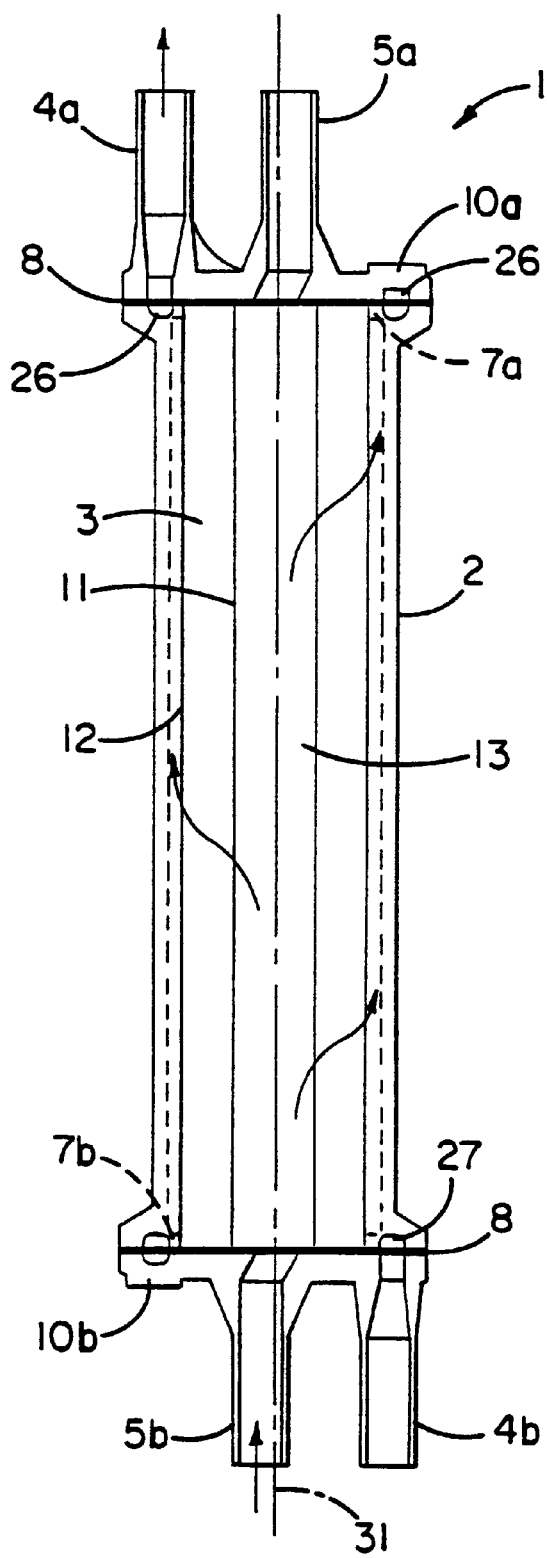
FIG. 1 is a partially sectioned view of a fluid treatment assembly embodying aspects of the invention.

Referring to FIG. 1, a fluid processing apparatus 1 embodying the present invention may include a housing 2 disposed about a porous element 3 with one or more end pieces 10a, 10b sealing the housing 2 to the porous element 3. The fluid processing apparatus 1 may include one or more openings. In preferred embodiments, the fluid processing apparatus includes at least a first opening in fluid communication with a first surface 11 of the porous element 3 and a second opening in fluid communication with a second surface 12 of the porous element 3. In the embodiment shown in FIG. 1, the filtering apparatus 1 includes first and second end pieces 10a, 10b disposed at opposite ends of the housing 2.

In preferred embodiments, the first and second end pieces 10a, 10b respectively include first openings 5a, 5b in fluid communication with the first surface 11 of the porous element 3 and a second openings 5a, 5b in fluid communication with the second surface 12 of the porous element 3.

However, each end piece 10a, 10b may be variously configured to include a plurality of first openings communicating with the first surface of the porous element, and a plurality of second openings communicating with the second surface of the porous element. In exemplary embodiments, it may be desirable to include two second openings and a single first opening in the first end piece and only first and second openings in the second end piece.

The first and second end pieces 10a, 10b are preferably identical. Identical end pieces allow the fluid processing apparatus 1 to be manufactured using only a single mold for the housing and a single mold for the end pieces. This significantly reduces the cost of production of the fluid processing apparatus 1. Identical end pieces have the further advantage of producing at least two openings 5a, 5b communicating with the first surface 11 of the porous element 3 and at least two openings 4a, 4b communicating with the second surface 12 of the porous element 3. Although the two openings in the end pieces may be variously utilized, in some applications the second opening in the end pieces may advantageously be used as a vent or bleed valve.

There are no particular restrictions on the type of housing in which the porous element is disposed. For example, the housing may be variously configured to have a cylindrical, oblong, rectangular, irregular, or other tubular configuration. In preferred embodiments, the housing is cylindrical and has a tubular portion disposed between first and second end portions.

Figure 2:
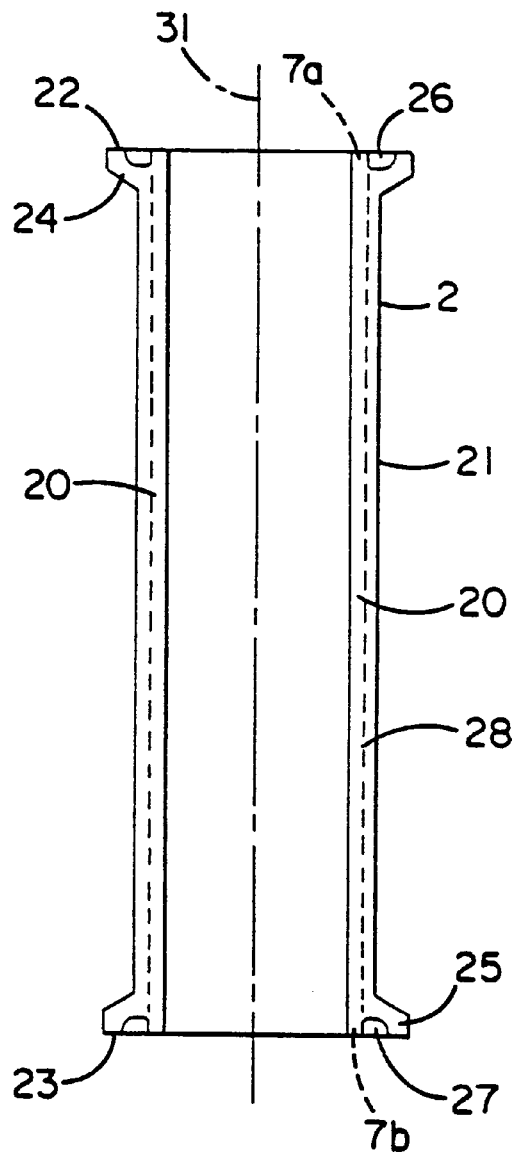
FIG. 2 is a partial sectional view of one exemplary embodiment of the housing of FIG. 1.
Figure 3:
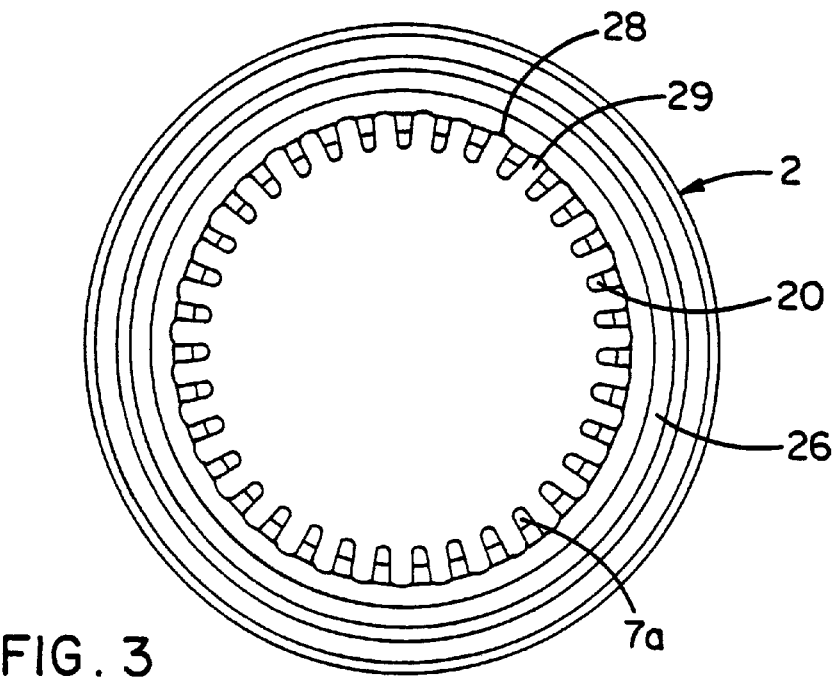
FIG. 3 is a top view of the housing shown in FIG. 2.
Figure 4:
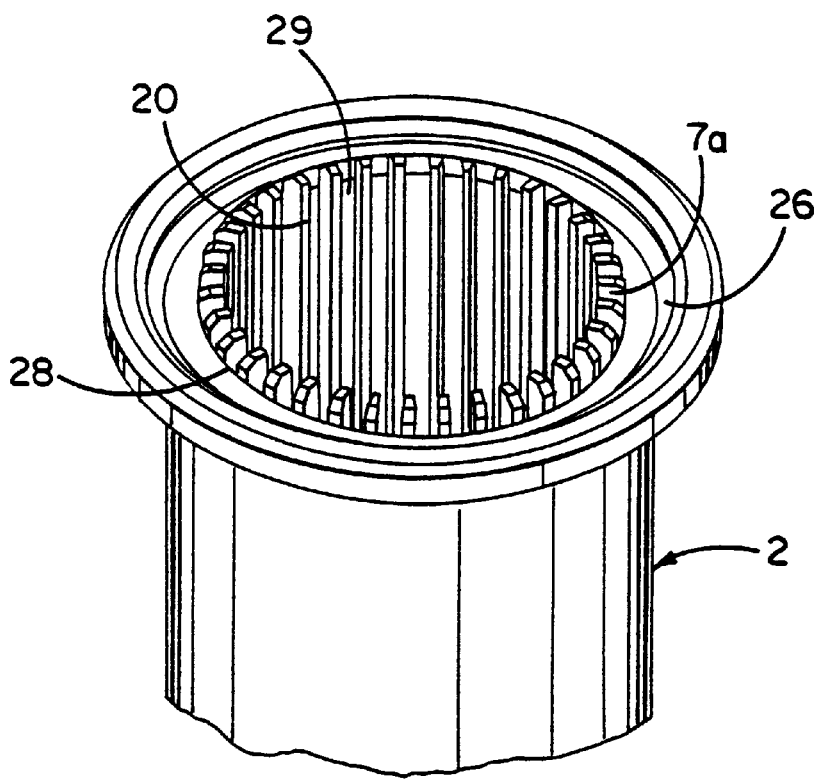
FIG. 4 is a perspective view of an end portion of the housing shown in FIG. 3.

FIG. 2 shows a longitudinal cross-sectional view of an embodiment of the housing 2 which is particularly suitable for use with the fluid processing assembly 1 according to the present invention. FIG. 3 shows a top view of the housing shown in FIG. 2, and FIG. 4 shows a perspective view of the housing shown in FIG. 2.

In preferred embodiments, the housing 2 includes a body portion 21 disposed between first and second end portions 22, 23. The body portion may be variously configured to include any shape. In preferred embodiments, the body portion is configured in a tubular shape. The first and second end portions may be smaller, larger, or the same size as the body portion. In preferred embodiments, the first and second end portions may respectively include flanges 24,25. Further, the flanges 24, 25 may respectively include channels 26, 27. The channels 26, 27 are preferably in fluid communication with grooves 29 and with the second openings 4a, 4b.

Figure 5A:
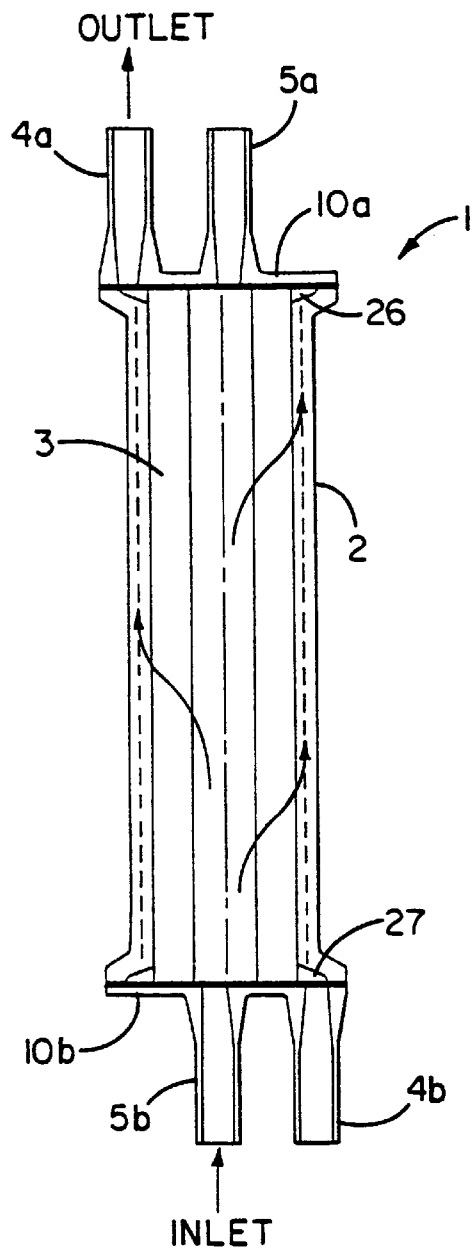
FIG. 5a is a partially sectioned view of a fluid treatment assembly in accordance with a second embodiment of the invention.
Figure 5B:
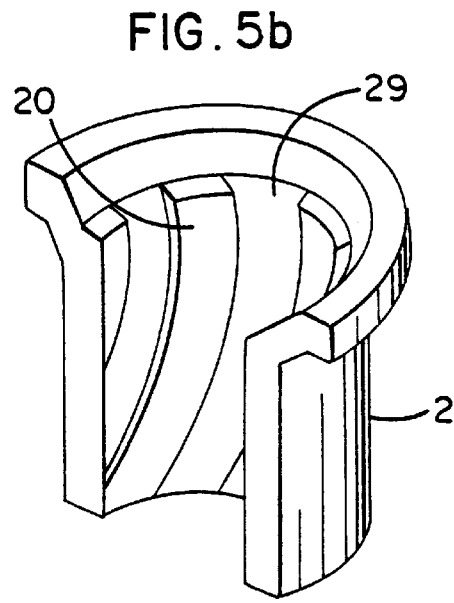
Figure 5C:
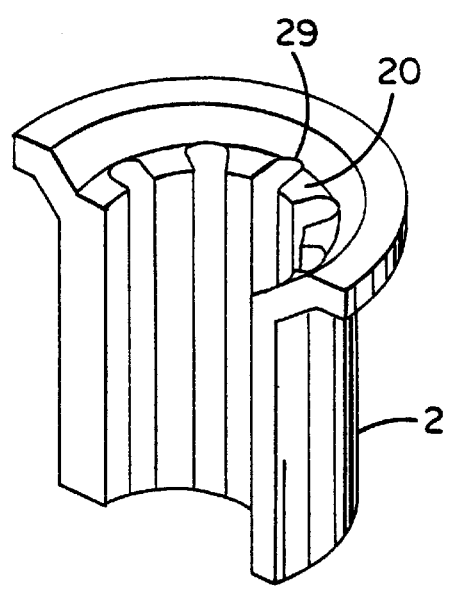
Figure 6:
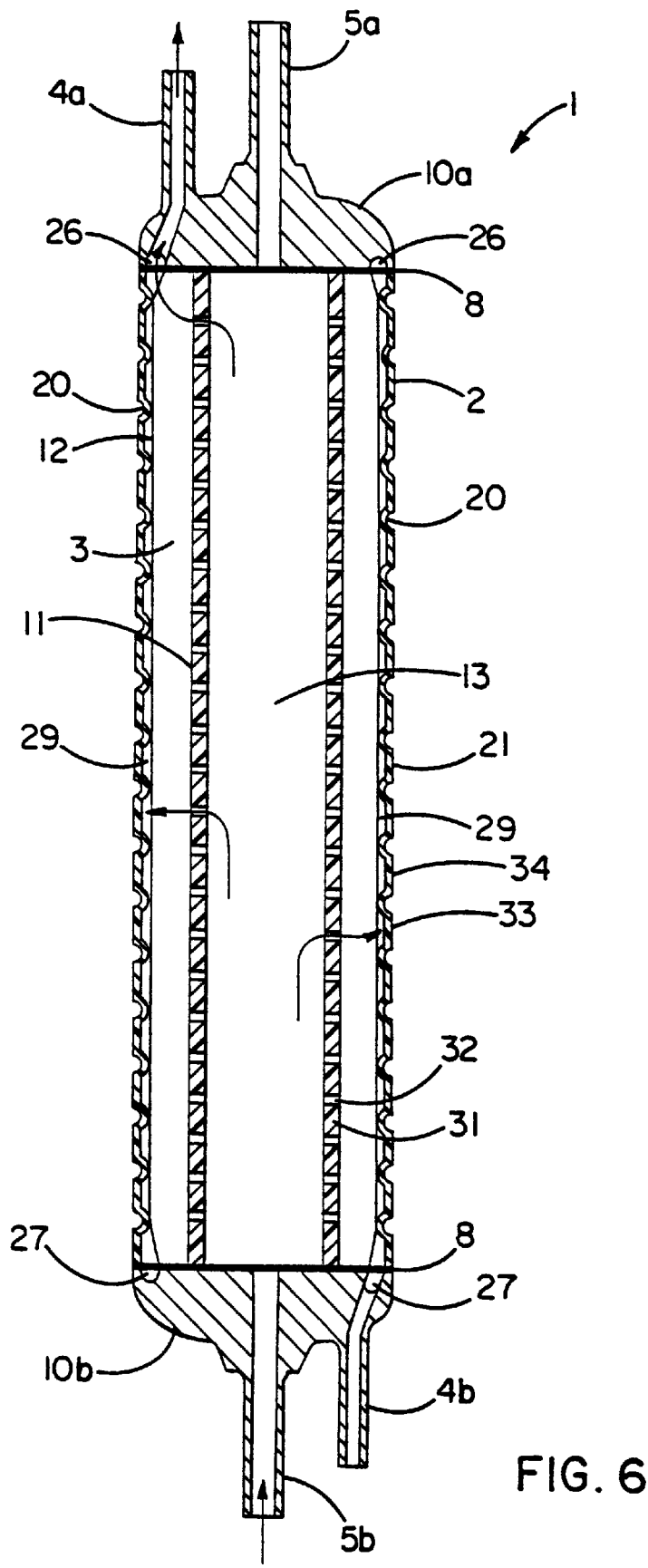
FIG. 6 is a partially sectioned view of a fluid treatment assembly in accordance with a third embodiment of the invention.

The channels 26, 27 may be of any suitable configuration, and variously formed to include any number of channels, and/or projections and in any shape including both regular and/or irregular annular configurations. For example, the channels may be formed in a flange 24, 25 with extended members 7a, 7b, as shown in FIG. 1. Alternatively, the channels 26, 27 may be formed by simply discontinuing the projections 20 near the first and second end portions 22, 23 as shown in FIG. 5a–5c. Further, the channels 26, 27 may be formed in the housing 2 alone (as shown in FIG. 5a), in the end pieces 10a, 10b alone, or in both the housing 2 and the end pieces 10a, 10b (as shown in FIGS. 1 and 6). In preferred embodiments, the channels are formed in both the housing and the end pieces because this configuration helps prevent the channels 26, 27 from filling with weld in embodiments where the end pieces 10a, 10b are welded to the housing 2. The channels may be formed in the same manner as the body, i.e., through a molding process. Alternatively, and less preferably, the channels may be machined into the housing 2.

The channels are preferably configured to allow all of the grooves 29 to be in fluid communication with the second openings 4a, 4b. In embodiments where there is a single second opening 4a, then a single channel 26 may be utilized. When the second opening 4a, 4b is located in the end piece 10a, 10b, then the channel 26, 27 is preferably disposed adjacent to the end portion 22, 23. When the second opening is located in the housing, the channel is preferably disposed in the housing adjacent to the second opening and configured to allow the grooves 29 to communicate with the second opening. For example, if the second opening is disposed towards a center region of the body portion 21, the channel is preferably disposed at the same axial location as the second opening.

In preferred embodiments, there are two second openings 4a, 4b disposed at opposite ends of the housing and the two channels 26, 27 located adjacent to the first and second end portions 22, 23, as shown in FIG. 1.

In exemplary embodiments of the fluid processing apparatus 1, the housing 2 includes deformations or projections 20, such as ribs or lands, which define passages or other channels 29 and enable fluid to flow between one or more of the second openings 4a, 4b and the second surface 12 of the porous element 3. Preferably, the housing 2 is configured to provide adequate fluid flow between the porous element 3 and the housing, while minimizing the hold-up volume of the housing 2 and pressure drop between the second surface 12 of the porous element 3 and the second openings 4a, 4b.

An inner peripheral surface 28 of the housing 2 preferably has a plurality of projections 20 which extend inward from the inner peripheral surface. When a porous element is disposed in the housing 2, in preferred embodiments, the projections 20 contact or are in close proximity with the outer periphery of the porous element 3 of the fluid processing apparatus 1. The projections 20 may be formed in any manner which will allow fluid to flow axially between the porous element 3 and the housing 2.

In a preferred embodiments, the projections 20 include ribs and define a plurality of grooves 29. The grooves 29 may be of any suitable configuration. For example, FIGS. 5b and 6 show embodiments with helical grooves 29. FIGS. 3, 4, and 5c show embodiments with substantially straight grooves 29.

The grooves 29 and/or projections 20 may be variously formed to include any number of grooves and/or projections, at constant or varying spacing. In some embodiments, the grooves 29 may be formed through the outer surface of the body 21 by deforming the second surface 34 of the housing 2 inwardly. For example, in the embodiment shown in FIG. 6, the grooves are formed in both the first and second surfaces 33, 34 of the housing 2 using a blow molding process. Blow molding may allow helical grooves or other regular or irregular projections to be easily formed. Alternatively and more preferably, the housing and projections can also be formed using other conventional techniques, such as injection molding or less preferably through secondary thermal forming or machining from sheet stock.

In a preferred embodiment shown in FIG. 1, the projections 20 are defined when the housing 2 is molded using injection molding. If injection molding is utilized to form the housing 2, it is preferable to form the grooves larger at one end than at the other, i.e., vary in volume in the axial direction. For example, the grooves may be tapered in thickness and/or depth such that the grooves gradually increase in cross section in the axial direction from the second end portion 23 to the first end portion 22. Varying groove thicknesses and/or depths allows for easy removal of the mold. Further, the groove dimensions may be matched to the fluid flow such that the grooves increase in size near the outlet opening.

The height of the projections 20, i.e., the distance from their peaks to the inner peripheral surface 28 of the body 21, is not critical but preferably is the minimum height necessary to allow adequate fluid flow between the porous element 3 and the inner peripheral surface 28 of the housing 2. Minimizing the height minimizes the hold-up volume of the housing 2. The minimum height will depend on the nature and the temperature of the fluid being filtered, the desired flow rate, the type of porous element, and other factors and can be determined by one skilled in the art using well-known techniques.

In preferred embodiments, the grooves 29 and projections 20 have rounded edges and/or valleys. A rounded configuration allows for efficient sterilization, facilitates mold removal, and prevents particle shedding and damage to the porous element 3 in the event the porous element 3 impinges against the projections 20 under pressure.

In embodiments where adjacent projections 20 define helical flow channels or grooves 29, it is preferred for the grooves 29 to extend helically along the length of the body 21. The body 21 may include a single helical groove, or a plurality of parallel helical grooves which may have the appearance of the threads of a multi-thread screw.

In addition to defining the grooves or flow channels 29, the projections 20 preferably provide support to the porous element 3. Whenever the fluid flows inside-out through the permeable cartridge or whenever the pressure inside the porous element 3 exceeds the pressure outside the porous element 3, the fluid exerts an outwardly-directed force on the interior of the cartridge. If this force is large enough and an exterior support or cage is lacking, then the cartridge may distend, distort, rupture, or even burst, thereby reducing the reliability of the porous element 3. In situations where the pressure in the interior space 13 of the porous element 3 is greater than the pressure in the exterior space 14 between the porous element 3 and the housing 2, the projections 20 preferably function as a cage for the porous element 3, supporting the porous element 3 against outwardly directed forces and thus increasing the overall reliability of the fluid processing assembly 1.

The spacing between adjacent projections 20 depends on the type of porous element, the fluid flow rate, the nature and temperature of the fluid being filtered, the desired fluid flow rate, the differential pressure between the interior space 13 and the exterior space 14 and other factors. The lower the differential pressure across the porous element 3, the less support is required for the porous element 3, so that there can be greater spacing between projections.

Figure 7:
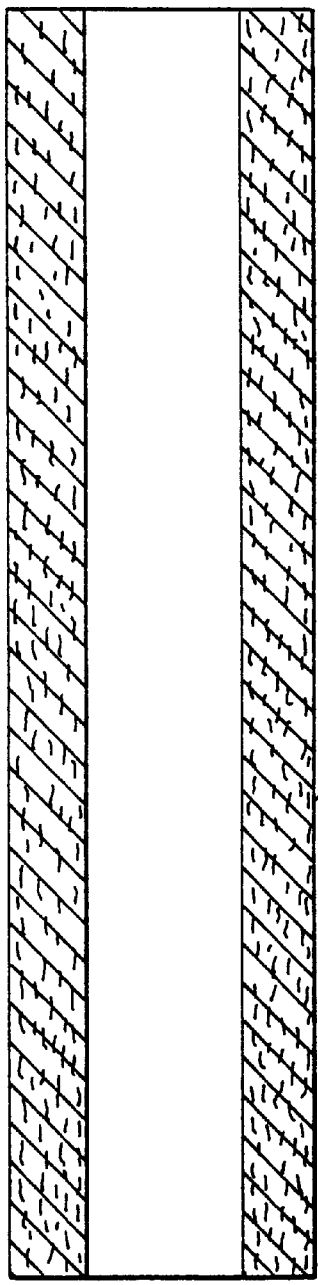
FIG. 7 shows a sectioned view of a porous element for use in a fluid treatment assembly in accordance with aspects of the invention.
Figure 8:
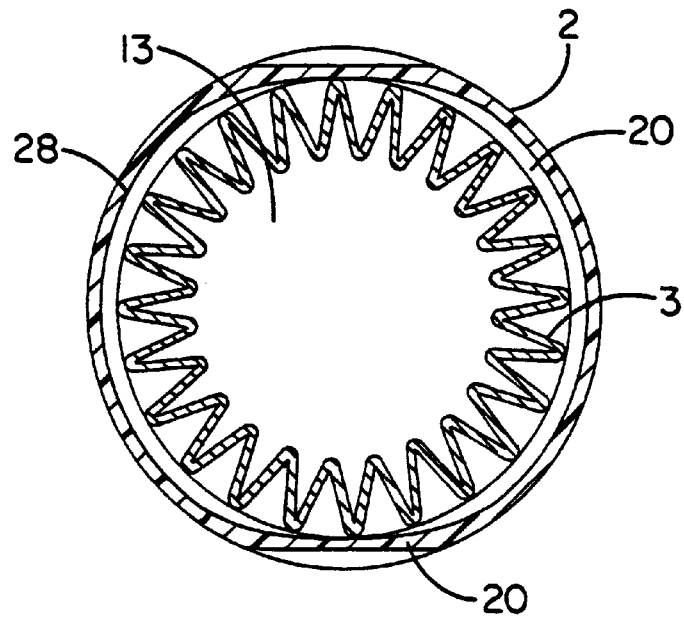
FIG. 8 shows a cross sectional view of a pleated porous element for use in a fluid treatment assembly in accordance with aspects of the invention.
Figure 9:
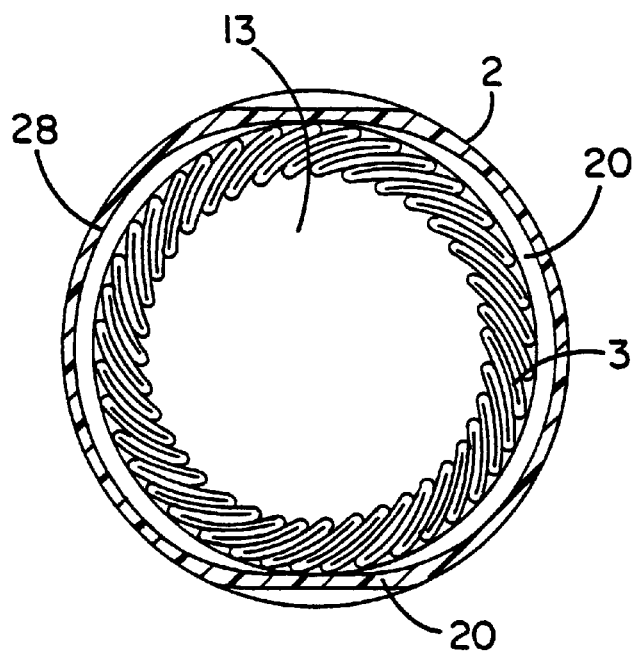
FIG. 9 shows a cross sectional view of a porous element having laid-over pleats disposed in a fluid treatment assembly in accordance with aspects of the invention.

As long as the projections 20 can support the housing pressure and support the porous element 3 while permitting fluid to flow along the length of the porous element 3, there is no restriction on the shape of the projections 20. For example, when the porous element is non-corrugated (as shown in FIG. 7), the projections 20 may extend in the axial direction of the housing 2 as shown in FIGS. 3–4. When the porous element 3 is corrugated with longitudinal pleats, (as shown in FIGS. 8–9), it may be desirable for the projections 20 to extend at an angle with respect to the axis of the housing 2. Having the grooves 29 disposed at an angle relative to the pleats prevents the porous element from deforming and filling the grooves with the porous material and blocking axial fluid flow.

The grooves 29 themselves are not an essential feature of the housing 2. A preferred embodiment includes grooves 2 because they are a convenient means of forming projections 20 in the inner peripheral surface 28 of the housing 2 and because grooved cylinders have an excellent strength-to-weight ratio. However, using various manufacturing methods, the housing 2 can comprise two individually-molded sections which are joined together by any suitable bonding, e.g., welding, subsequent to molding. Consequently, each of the sections of the housing 2 can have a smooth exterior surface and any configuration of projections 20 including bumps, zig-zag grooves, or other regular or irregular projections. In preferred embodiments, the housing 2 is molded as a single piece. In this manner, the manufacturing process is simplified and the cost of the molds is reduced.

If projections 20 are included, the projections 20 may include an extended members 7a, 7b extending from the body portion 21 at respective first and second end portions 22, 23. In preferred embodiments, the extending members 7a, 7b extend axially to contact the first and second end pieces 10a, 10b, respectively. In this manner, fluid may flow between the grooves 29 and the channels 26, 27, by passing between the extending members 7a, 7b. The extending members 7a, 7b have the additional advantage of supporting the porous element 3 at locations adjacent to the first and second end pieces 10a, 10b, while adding strength to the bond between the end pieces 10a, 10b and end portions 22, 23 of the housing 2. As shown in FIGS. 5a–c and 6, although the extended members are preferable, the extended members are not required. Further, the lack of the extended members may reduce the complexity of the mold.

The first and second end pieces 10a, 10b may be variously configured to be larger than, the same size as, or smaller than the first and second end portions 22, 23 of the housing 2. In preferred embodiments, the outer diameter of the end pieces 10a, 10b are the same or substantially the same size as the outer diameter of the end portions 22, 23 of the housing 2. FIG. 5a shows an embodiment in which the end pieces are flat with the second openings 4a, 4b disposed in fluid communication with the channels 26, 27. FIGS. 1 and 6 show end pieces including annular channels mating with the channels in the housing 2. The channels 26, 27 allow fluid flow between the grooves 29 and the second openings 4a, 4b.

As shown in FIG. 7, the porous element 3 may comprise a filtration medium having a fibrous mass such as a mass of microfibers available from Pall Corporation under the trademark PROFILE. The microfibers of the PROFILE medium are substantially free of fiber-to-fiber bonding and are secured to each other by mechanical entanglement. U.S. Pat. Nos. 4,594,202 and 4,729,901 disclose the PROFILE medium and are incorporated by reference. The PROFILE medium is a high dirt capacity medium. However, because the fibers are not bonded to one another, the medium lacks sufficient strength to readily resist the outwardly-directed forces exerted on the medium or any significant pressure drop between the inside and the outside of the medium. The force required to distort such a porous element may be relatively small. Accordingly, the projections 20 and/or grooves 29 may be required to be closely spaced and/or deeper than those required for other types of porous elements 3.

In alternative embodiments, the porous element 3 may comprise any other suitable filter media, including, for example, multiple layers of a single filter medium or different filter media and one or more layers of a support and drainage medium. The filter medium may comprise one or more fibrous sheets including natural or synthetic fibers, such as polymeric fibers, or inorganic fibers such as glass fibers. The filter medium may also comprise one or more porous films, such as a polymeric membrane. As shown in FIG. 8, a cylindrical porous element having longitudinally-extending pleats may be utilized. In this embodiment, a plurality of pleats are arranged to define a cylinder. A tubular core or porous interior and/or exterior wrap (not shown) may also be included. As viewed in a transverse cross-section of FIG. 8, the individual pleats of such a porous element extend generally radially outward from the axis 31 toward the outer periphery of the porous element 3.

In another alternative embodiment, the porous element 3 may be comprise a laid-over pleat design. For example, as shown in FIG. 9, the porous element may include a plurality of longitudinal pleats, each of the pleats having a pair of legs. Each of the legs has a first and a second surface. The pleats are in a laid-over state in which the first surface of each leg is in intimate contact with the first surface of an adjoining leg and the second surface of each leg is in intimate contact with the second surface of an adjoining leg over substantially the entire height of each leg and over a continuous region extending for at least approximately 50% of the axial length of the porous element. If a porous element 3 having laid-over pleats is utilized, it may be desirable to include an upstream and downstream cushioning and/or drainage layers interposed near the filter medium of the porous element 3. An exemplary porous element 3 having laid-over pleats is shown in International Application PCT/US93/10697, entitled PLEATED FILTER ASSEMBLY, AND THE METHOD AND APPARATUS FOR MAKING, published on May 26, 1994 with International Publication Number WO 94/11082, and herein incorporated by reference.

Frequently, the fluid is forced to flow outwardly from the interior to the exterior of the hollow, porous element 3. For example, the fluid may enter the first opening 5b in the second end piece 10b, flow axially along the interior space 13, laterally inside-out through the porous element 3, axially along the exterior space 14 between the porous element and the housing 2, and then exit through the second opening 4a in the first end piece 10a.

This "inside-out" flow may be the normal direction of flow through the element, because it may have certain advantages. For example, many porous elements have a graded porosity with the coarsest pores on the upstream portion of the porous element and the finest pores on the downstream portion of the porous element. If the normal direction of flow is inside-out, the downstream portion of the cartridge where the pores are finest is the exterior portion of the cartridge where the diameter of the cartridge is greatest. This helps to reduce the pressure drop across the finest porosity portion of the porous element.

Under certain circumstances, the "inside-out" flow may occasionally be reversed. This reversal of the normal flow may be accidental, e.g., due to a surge in fluid pressure downstream from the porous element, or it may be intentional, e.g., to flush an accumulated cake of particulate matter from the surface of the porous element. If a significant reversal of flow is anticipated, it may be desirable to include a core 31 disposed coaxially within and adjacent to the interior peripheral surface of the porous element 3 as shown in FIG. 6. The core 31 may be fabricated from any substantially rigid material that is compatible with the fluid being processed and the bonding process. Preferably, the core 31 is perforated and thus has holes 32 to allow the fluid to pass therethrough. Alternatively, the core may be fabricated from a substantially rigid, fluid-permeable material, for example, a porous metal composite, a wire mesh structure or a polymer or other substantially rigid substance. In embodiments having a core, the core 31 supports the porous element 3 against inwardly directed forces and prevents the element from collapsing inwardly. The core 31 may be bonded to the end pieces 10a, 10b in the same manner as the housing. Alternatively, the core can simply be inserted in the porous element without bonding it to the end pieces.

For pleated porous elements, a problem may arise in that when the pressure in the interior space 13 of the porous element 3 exceeds the pressure in the exterior space 14 between the porous element 3 and the housing 2, the porous element 3 and particularly a pleated porous element 3 may deform outwardly and fill the grooves 29. If the porous element 3 deforms into the grooves, axial fluid flow may be substantially reduced, or even blocked. Accordingly, it may be desirable to include a mechanism which prevent the porous element from filing the grooves 29 while under pressure.

For example, although the longitudinal pleats shown in FIGS. 8–9 may be utilized in any of the embodiments of the fluid processing assembly 1, it may be desirable to utilize a housing 2 having helical grooves 29 as shown in FIGS. 5b, and 6 with the longitudinal pleats. Helically extending projections 20, or other projections which are not aligned with the direction of the pleats prevent the porous element 3 from deforming and filling the grooves and thus hindering or blocking axial fluid flow.

Helically extending projections 20, however, may have several disadvantages. For example, fluoropolymers frequently utilize an injection molding process. Producing molds having helical grooves 29 is expensive. Further, removing a molded housing 2 having helical grooves from the mold may be difficult, increasing the manufacturing costs, and increasing the potential for the introduction of extractables into the fluid being processed. Accordingly, it may be preferable to utilize substantially straight, axially extending grooves 29, as shown in FIGS. 1–3. Substantially straight grooves 29 allow for reduced mold costs and easy removal of the housing 2 from the mold.

If substantially straight grooves 29 are utilized, the porous element may include an outer wrap or other covering material. In some embodiments, a conventional helically extending wrap may be utilized. However, because the end pieces 10a, 10b are contemporaneously bonded to both the housing 2 and porous element 3, a conventional helically extending wrap is difficult to maintain in position during the bonding process. Accordingly, it may be desirable to utilize a wrap configured in a sock or tubular shape which is disposed over the pleated element. The tubular shaped wrap may be made of the same or different material as the porous element 3. The wrap preferably includes a plurality of perforations. The perforations allow for radial fluid flow and minimize the wetted surface area. However, the perforations must be sufficiently small to prevent the porous element 3 from deforming into the grooves 29. It may be desirable to dispose the tubular wrap over the porous element 3 prior to assembling the filtering apparatus 1.

One problem with including a wrap is that a wrap increases the wetted surface area and hence the level of extractables in the fluid being processed by the fluid processing apparatus 1. Accordingly, if substantially straight grooves 29 are utilized, it may be desirable to modify the porous element itself to prevent deformation into the grooves 29. For example, it has been found that a pleated porous element may be configured in a helical shape. A helically shaped porous element may be manufactured using any suitable technique, e.g., molding or stretching.

In a preferred manufacturing technique, a pleated porous element is fitted over a tool such that the tool is disposed adjacent to the first surface of the porous element. One end of the porous element is then rotated with respect to the opposite end. This operation may be performed in conjunction with the manufacture of the porous element into a tubular configuration. The angle of rotation may be variously configured. In exemplary embodiments, the angle of rotation may be between 5 and 3600 degrees, and preferably between 90 and 1800 degrees, and more preferably between 180 and 720 degrees, and even more preferably between 270 and 540 degrees, and most preferably about 360 degrees. The angle of rotation is dependent on the composition, length, and configuration (i.e., conventional pleats or laid-over pleats) of the porous element. For example, certain fluoropolymers may be more flexible and hence tolerate a greater angle of relative rotation than other substances such as certain polyamides. Further, a laid-over pleat design may tolerate a greater angle of rotation than a conventional pleat design. Additionally, a porous element having a long axial length may require a greater degree of rotation than a porous element with a relatively short axial length.

The projections 20 of the housings 2, shown in the above embodiments, have been located on the inner peripheral surface of the non-perforated housing. However, for some porous elements this configuration may be problematic. As discussed above, for example, certain types of porous elements may extrude into the grooves when differential pressure applied to the porous element exceeds a predetermined value. Although a wrap may be utilized to control this problem, having both a wrap and fluid flow grooves in the housing increases the surface area for generating extractables.

As an alternative, a large number of fluid flow grooves may be disposed on the inner peripheral surface of the housing with each individual groove decreased in size to about between 1–2 mm or less. In this configuration, the wrap may be eliminated. However, grooves of this size are difficult and costly to reliably manufacture on the inner peripheral surface of the housing.

In order to overcome these difficulties, an alternate preferred embodiment includes an annular fluid flow member disposed between the outer peripheral surface of the porous element and the inner peripheral surface of the housing. The annular fluid flow member may be variously configured to include any flexible, semi-flexible, or non-flexible material and any suitable manufacturing technique. For example, any of the materials and techniques discussed above with regard to the manufacture of the housing and/or the porous element including the mesh and/or wrap may be utilized for the fluid flow member.

The annular fluid flow member may occupy some, most, or all of an annular/cylindrical region between the outer second surface of the porous element and the inner surface of the housing. The fluid flow member including any perforations and/or fluid flow passages preferably occupies about all of the cylindrical region between the porous element and the housing. The cylindrical region may be variously configured but preferably has a radial cross-sectional thickness of between about 0.5 mm and 35 mm, and more preferably between about 1.0 mm and 15 mm depending on the particular configuration of the fluid flow member. The minimum cross-sectional thickness is typically that thickness which enables fluid flow passages or grooves to pass fluid in the annular region from one end of the porous element to the other without significantly increasing the pressure drop generated by the fluid processing apparatus. The cross-sectional thickness may vary depending on the configuration of the annular fluid flow member and the nature of the fluid. The fluid flow member may extend for some, most or all of the axial length of the cylindrical region. Preferably, the fluid flow member extends throughout the entire axial length of the cylindrical region.

The annular fluid flow member may be substantially simpler to manufacturer and easier to maintain within close tolerances than the fluid flow grooves disposed on the inside of the housing. For example, a housing having a smooth inner peripheral surface may be utilized in conjunction with an annular fluid flow member. Where the annular fluid flow member is formed as a cage, the fluid flow grooves may be formed along the outer peripheral surface. When the fluid flow grooves are disposed on the outer peripheral surface of the annular fluid flow member, the grooves preferably communicate with the porous element through a plurality of radially extending perforations extending through the annular fluid flow member. Where the annular fluid flow member is formed as a flexible outer porous member, the fluid flow grooves may be disposed inside and/or outside of the outer porous member.

Figure 10:
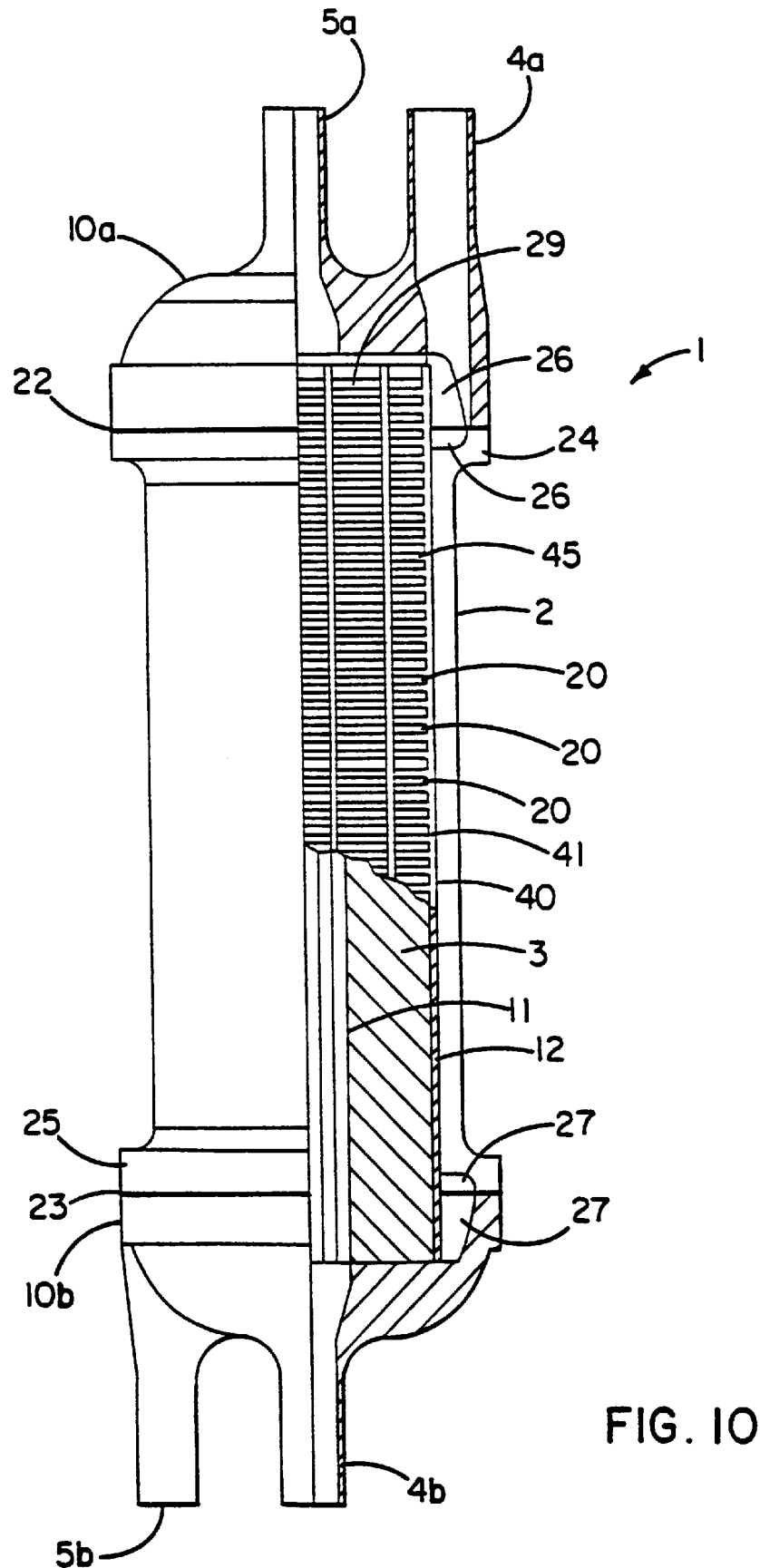
FIG. 10 shows a partially sectioned view of another embodiment of a fluid processing assembly.
Figure 11:
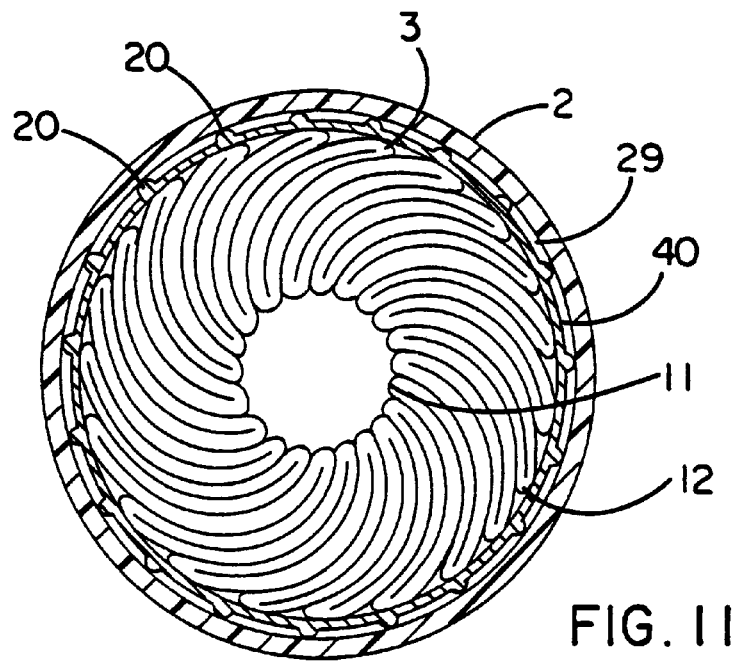
FIG. 11 shows a cross sectional view of the fluid processing assembly shown in FIG. 10.

For example, FIG. 10 shows another preferred embodiment of the fluid processing apparatus 1 which includes an annular fluid flow member in the form of a cage 40. Elements of the present embodiment are identified with similar reference numerals as similar elements in other embodiments. The cage 40 preferably includes a plurality of perforations 41 communicating with a plurality of grooves 29 defined by a plurality of projections 20. A cross sectional view of one embodiment of the fluid processing apparatus of FIG. 10 is shown in FIG. 11. Projections 20 disposed on the exterior of the cage 40 may be more reliably formed within closer tolerances and with less expense than projections disposed on the interior surface of the housing.

The inner peripheral surface of the housing 2 may be smooth or include projections. Preferably, the inner peripheral surface of the housing is smooth with the cage including projections 20 of the cage 40 which abut against the smooth inner surface of the housing 2. In this manner, a plurality of fluid flow grooves 29 are formed about the inner peripheral surface of the housing in a similar manner as discussed above with other embodiments.

The cage 40 may be variously configured. In the embodiment illustrated in FIG. 10, the fluid flow grooves are disposed on the exterior surface of the cage 40. The fluid flow grooves may be alternately configured to be disposed on the interior, exterior, or within the cage 40. In the most preferred embodiments, the fluid flow grooves are disposed on the exterior of the cage 40. The cage 40 may include one or more axially extending members. Preferably the axially extending members are coupled together using any suitable member such as a plurality of thin annular bands. In some of the most preferred embodiments, a perforated cylindrical shell forms the cage with a plurality of projections disposed on the outer surface of the cylindrical shell. Where the projections/grooves are disposed on the outer peripheral surface of the cage, the grooves do not directly contact the porous element. Accordingly, the grooves need not be closely space to prevent the porous element 3 from extruding into the fluid flow grooves. The perforations in the cage allow for radial flow from the porous element, through the projections, and into the fluid flow grooves. The fluid flow grooves in the cage are preferably configured to have a low edgewise flow resistance. This low edgewise flow resistance may be enhanced by increasing the cross-sectional area of the axially extending fluid flow grooves and configuring the fluid flow grooves to communicate with a plurality of perforations.

The cage 40 may also serve to retain the pleats in a laid-over state, where a porous element having laid-over pleats is utilized. Further, the cage 40 may be constructed to be relatively thin and abut against the housing 2. In this configuration, the housing may support the cage and consequently the porous element against outwardly directed forces.

Where the porous element is in direct contact with the perforations, it is often desirable to fabricate the perforations 41 with a sufficiently small cross-sectional area to prevent the porous element 3 from extruding into the perforations. For example, the perforations may have an axial extending width of between about 5 mm and about 0.1 mm and preferably between about 4 mm and about 0.64 mm and even more preferably between about 3 mm and about 1.0 mm. The perforations may have a circumferential width extending perpendicular to the pleats of between about 30 mm and about 0.1 mm and preferably between about 20 mm and about 0.64 mm and even more preferably between about 18 mm and about 1.0 mm. For example, the perforations may have an area of between about 50 $mm^2$ and 0.25 $mm^2$ and preferably between about 40 $mm^2$ and 0.64 $mm^2$.

Figure 12:
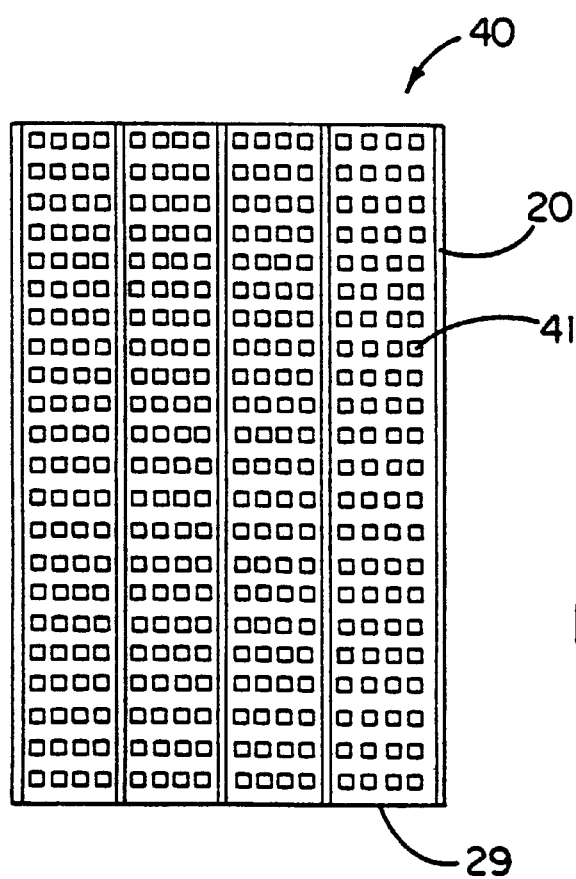
FIG. 12 shows an alternate embodiment of a cage for use in the fluid processing assembly of FIG. 10.

FIG. 12 shows one exemplary embodiment of a fluoropolymeric cage having perforations with a cross-sectional area of about 2.5 $mm^2$ to 1.5 $mm^2$.

The density of the perforations may also be variously configured. For example, the density of the perforations may range from between about 1 and 400 per cm$^2$ and preferably about 2 and 200 per cm$^2$. The density of the perforations is preferably configured to allow fluid to flow from the second surface 12 of the porous element 3 through the perforations 41 and into the grooves 29 without significant restriction on the fluid flow or pressure drop.

As shown in FIG. 11, the cage 40 preferably fits snugly into the housing 2 with substantially no clearance between the cage and the housing and/or porous element. In other words, the cage abuts the housing and/or porous element. By substantially no clearance, it is meant that the outer diameter of the cage, e.g., at the projections, is substantially equal to the inner diameter of the housing—while allowing for insubstantial variations and tolerances due to, for example, molding variations and thermal expansion between the housing and cage. Where the fluid flow grooves 29 are disposed along the outer surface of the annular fluid flow member 45, the housing 2 preferably forms a first side of the grooves 29 with the annular fluid flow member 45 forming a second side of the grooves 29.

The fluid processing apparatus 1 may be assembled by first disposing the annular fluid flow member 45 about the porous element 3 and then inserting them into the housing 2. For example, a cage 40 with fluid flow grooves 29 on the exterior surface may be disposed over the porous element 3 and then the apparatus 1 may be subsequently assembled by inserting the cage 40 and the porous elements into the housing 2. Alternatively, the annular fluid flow member 45 may first be disposed in the housing 2 with the porous element 3 thereafter inserted into the cage 40. In each of the embodiments, the annular fluid flow member 45 may comprise a single element or a plurality of elements disposed adjacent to or spaced from each other in either the axial and/or radial direction.

An example of one of the most preferred embodiments where the cage is disposed between the housing and the porous element is configured as outlined below.

Element A - An example of one of the most preferred embodiments of the fluid processing apparatus shown in FIG. 10:

| | |
|---|---|
| Upstream drainage layer | Pall TF2 Non-woven fluoropolymer mesh |
| Coreless Filter medium | Pall Flex made from PTFE membrane with a 0.05 micrometer absolute removal rating |
| Downstream drainage layer | Pall TF2 Non-woven fluoropolymer mesh |
| Outer porous member/wrap | Nalle extruded fluoropolymer mesh (Nalle 0.040D 15 × 15) |
| Number of pleats = 75 | |
| Pleat height = 50 mm (laid over) | |
| Inner diameter of porous element = 25 mm | |
| Outer diameter of porous element = 87 mm | |
| Housing I.D. = 89 mm | |
| Housing Length = 25.5 cm | |
| Outer porous member I.D. = 87 mm | |
| Outer porous member O.D. = 89 mm | |

Figure 13:
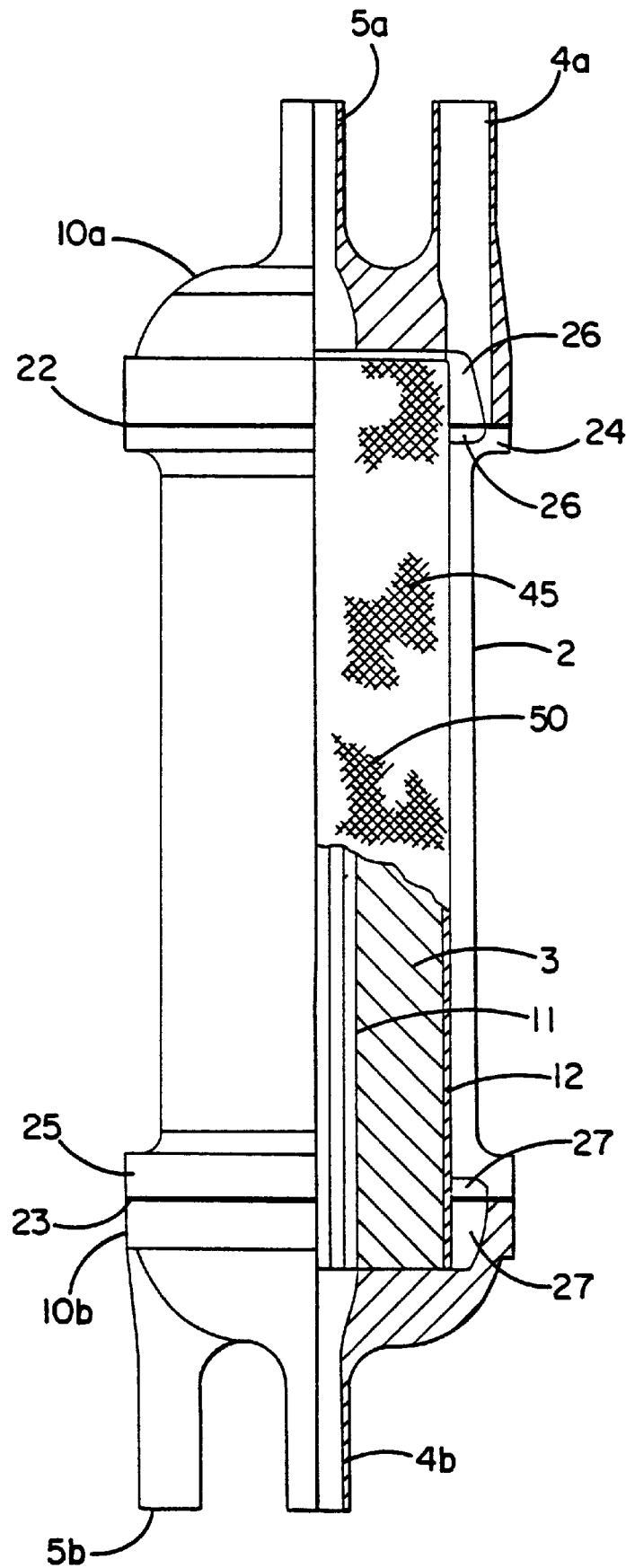
FIG. 13 shows a partially sectioned view of another embodiment of the fluid processing assembly having an outer porous member with low edgewise flow resistance.
Figure 14:
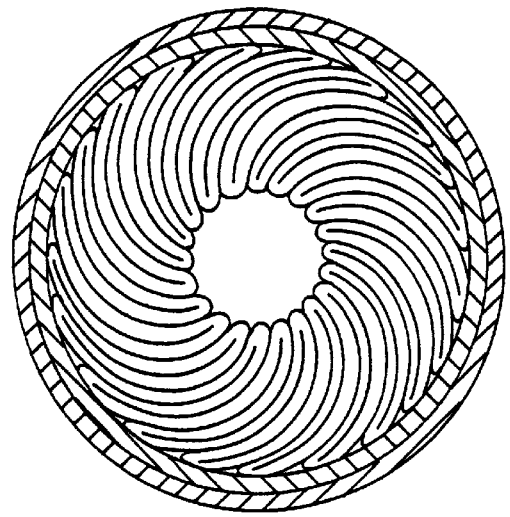
FIG. 14 is a cross sectional view of the fluid treatment assembly of FIG. 13.

FIG. 13 shows a partially sectioned view of another preferred embodiment of the fluid processing apparatus 1 where the annular fluid flow member 45 includes an outer porous member 50 having low edgewise flow resistance (e.g., the outer porous member may include fluid flow grooves or passages which allow fluid to flow axially through the outer porous member in the edge-wise direction without a significant pressure drop). FIG. 14 shows a traverse cross sectional view of the fluid processing apparatus 1 shown in FIG. 13.

The outer porous member preferably acts as a cage to support the porous element 3 against inside-out directed forces. The outer porous member may also serve to retain the pleats in a laid-over state, where a porous element having laid-over pleats is utilized. For example, the outer porous member may be a sheet of material wrapped around the porous element with sufficient tension to prevent the pleats from unbending from a laid-over state. The sheet of wrapped material may be wrapped in one or more concentric bonds or cylinders or helically wrapped about the porous element using one or more turns and one or more parallel strips of a flexible material. The outer porous member may completely or partially envelop the outer periphery of the porous element. In some of the most preferred embodiments, the outer porous member envelops about the entire outer periphery of the porous element to prevent the porous element from extruding into any gaps in the porous member.

Where the outer porous member is in the form of a wrap, the outer porous member may be wrapped around the porous element with or without overlap between adjacent turns of the wrap. For example, adjacent turns of the outer porous member can abut each other with substantially no overlap, or by employing an overlap, it is possible to wrap multiple layers of the outer porous member around the porous element. If gaps are to be disposed between adjacent turns of the outer porous member, the gaps are preferably sized to prevent the porous element from extruding into the gaps between successive turns of the outer porous member.

As with the cage, the outer porous member 50 may be made of any material which is porous, has a low edgewise flow resistance, and is compatible with the fluid being filtered such as the materials utilized to construct the porous element and/or the housing. For example, the outer porous member 50 may comprise a mesh/screen. Meshes and screens (also called netting) come in various forms. For high temperature applications, a metallic mesh/screen may be employed, while for lower temperature applications, a mesh (e.g., a polymeric mesh) may be particularly suitable. Polymeric meshes come in the form of woven meshes, expanded meshes, and extruded meshes. Either type may be employed, but extruded meshes are generally preferable because they are smoother and therefore produce less abrasion of the outer peripheral edge of the pleats. In some embodiments where an extremely smooth outer porous member is desired, a non-woven fabric may be included as part of the outer porous member either by itself or in conjunction with a mesh. For example, a polyester non-woven fabric sold under the trade designation Reemay 2011 by Reemay, Inc. may be disposed between the porous element and the mesh to cushion the porous member against the mesh.

Further, an extruded mesh is particularly preferred in applications which require low pressure drops and high flow rates because extruded meshes have a low edge-wise flow resistance. An extruded mesh may have a first set of parallel strands extending in a first plane and a second set of parallel strands extending in a second plane spaced from the first plane, where the second set of strands is bonded to the first set of strands and intersects the first set of strands at an angle. The mesh count for the first and second sets of strands need not be identical. For example, if the first set of strands abuts the porous element, the first set of strands may have a higher mesh count than the second set of strands which abut the housing. Further, the strands which abut the porous element may be disposed at an angle to the axially extending pleats. For example, perpendicular to the axially extending pleats. Further, in some embodiments, three, four, five, six, or more layers of strands may be utilized to reduce the edgewise flow resistance. Extruded meshes may be classified as either symmetrical or non-symmetrical. In a symmetrical mesh, neither of the first or second sets of strands extends in the so-called "machine direction" of the mesh, which is the direction in which the mesh emerges from a mesh manufacturing machine. In a non-symmetrical mesh, one of the sets of strands extends parallel to the machine direction. In the present invention, it is possible to use either symmetrical or non-symmetrical meshes to form the outer porous member. Non-symmetrical meshes have a somewhat lower resistance to edgewise flow per thickness than do symmetrical meshes. Therefore, for a given edgewise flow resistance, a non-symmetrical mesh can be thinner than a symmetrical mesh and therefore is preferred where minimizing hold-up volume is desirable.

The openings of the outer porous member may be variously configured depending on various factors similar to those previously discussed with respect to the cage, including factors such as the applied pressures, the anticipated fluid viscosity, and/or the particular characteristics of the porous element. Preferably the openings in the outer porous member should be small enough to prevent the porous element from extruding into the openings. Further, the openings in the outer porous member should be large enough to form sufficient flow grooves which extend axially along the porous element and prevent excessive pressure drops.

Meshes may be characterized by their thickness and by the number of strands per inch. These dimensions are not limited to any particular values and can be chosen in accordance with the desired edgewise flow characteristics of the mesh, the desired ability to resist compression between the porous element and the housing, and the propensity of the particular porous element utilized to extrude through the openings of the mesh. Where the first of strands of the mesh is the set adjacent to the porous element, the strands of the first set may typically have a mesh count of between about 5 and 40 strands per inch and more preferably of between about 10 and 30 strands per inch, and even more preferably between about and 20 strands per inch. In configurations with less than 5 strands per inch, the porous element 3 may extrude into and fill the interstices between adjacent strands of the mesh. Configurations with more than 40 strands per inch are difficult to manufacture as an extruded mesh with a low edge-wise flow resistance. The mesh count of the second set of strands, e.g., the set of strands adjacent to the housing may be the same as or different from the mesh count of the first set of strands. In particular, the mesh count of the second set of strands may be smaller than the mesh count of the first set of strands, e.g., between about 1 and 15 strands per inch.

The thickness of the mesh may vary depending on the fluid flow rate, housing configuration (particularly length of the porous element), desired pressure drop, and fluid being processed. The mesh is preferably between about 0.5 mm and about 10 mm in thickness, and more preferably between about 0.75 mm and about 5 mm in thickness and even more preferably between about 1 mm and about 3 mm in thickness. A mesh significantly greater than 10 mm in thickness may excessively increase the hold-up volume of the fluid processing apparatus. A mesh significantly less than about 0.5 mm in thickness may adversely affect the pressure drop characteristics of the fluid processing apparatus 1.

The outer porous member 50 may be relatively thick e.g., at least about 1 mm, to resist large outwardly directed stresses when the porous element is being subjected to inside-to-outside flow and to minimize edgewise flow resistance. However, where a relatively thin material is utilized (e.g., less than about 0.5 mm), it is preferred to wrap this material about the porous element a number of times such that the thickness of the outer porous member is within the ranges specified above. However, a thin material is less preferred since wrapping the material many times around the porous element may complicate manufacturing of the fluid processing apparatus.

The outer porous member 50 may comprise, for example, any porous, polymeric, non-woven material such as that available from Reemay Corporation under the trade designation Reemay. However, these fabric materials are not preferred since they may increase the edgewise flow resistance. Examples of suitable extruded polymeric meshes are those made by Nalle Plastics (Austin, Tex.) under the trade names Naltex, Zicot, and Ultraflo. The extruded mesh may also comprise an extruded fluoropolymer mesh made may Nalle Plastics (e.g., Nalle 0.040D 15×15). Other types of netting or meshes may also be utilized, such as expanded meshes.

The outer porous member may or may not be secured to the porous element. In some embodiments, the outer porous member may be configured as one or more sleeves, wraps, and/or strips disposed about the porous element and held in close proximity to the porous element by the housing, the first and/or second end piece and/or by bonding/welding. If the outer porous member is secured to the porous element, the tension of the outer porous member can be selected in accordance with the expected filtering conditions. In one of the most preferred embodiments, the outer porous member is configured as a cylinder or sleeve disposed over the porous element 3. The cylinder or sleeve may be held in place by compressive force between the porous element 3 and the cylinder/sleeve and/or the housing 2. Alternatively, the outer porous member 50 may be wrapped around a cylindrical porous element by disposing the porous element on a mandrel and rotating the mandrel and the porous element while applying the wrap member to the porous element. The pleats of the porous element can be formed into the laid-over state either before or during wrapping.

An example of one of the most preferred embodiments of a fluid processing apparatus 1 having an outer porous member is listed below.

Element B - One of the most preferred embodiments of the fluid processing apparatus shown in FIG. 14 may have the following configuration:

| | |
|---|---|
| Upstream drainage layer | Pall TF2 Non-woven fluoropolymer mesh |
| Coreless Filter medium | Pall Flex made from PTFE membrane with a 0.05 micrometer absolute removal rating |
| Downstream drainage layer | Pall TF2 Non-woven fluoropolymer mesh |
| Outer porous member/wrap | Nalle extruded fluoropolymer mesh (Nalle 0.040D 15 × 15) |
| Number of pleats = 75 | |
| Pleat height = 50 mm (laid over) | |
| Inner diameter of porous element = 25 mm | |
| Outer diameter of porous element = 87 mm | |
| Housing I.D. = 89 mm | |
| Housing Length = 25.5 cm | |
| Outer porous member I.D. = 87 mm | |
| Outer porous member O.D. = 89 mm | |

As discussed above, in many applications the cylindrical region defined by the inner periphery of the housing has become standardized. In many of these applications, the inner surface of the housing is smooth. Accordingly, a problem arises as to how to minimize the hold-up volume and to maximize the filtration surface area for a given housing and particularly a housing without fluid flow grooves in the side wall. The embodiments shown in FIGS. 11–15 may be adapted to solve this problem.

For example, a laid-over pleat configuration may be utilized where each of the opposing surfaces of adjoining legs of the pleats are in intimate contact with the radially outer portions of the pleats of the porous element displaced in the circumferential direction with respect to radially inner portions of the pleats over substantially the entire axial length of the porous element and over substantially the entire radial length of the pleat. The displacement in the circumferential direction may be particularly useful since it allows the pleated porous element to occupy at least about 70%, preferably at least about 75%, more preferably at least about 80%, even more preferably between about 85% and 95% of the cylindrical region defined by the outer crests of the pleats. For example, the percentage of the total volume and cross-sectional area occupied by the porous element for a tubular laid-over pleat configuration as described above may be defined as:

$$\text{Area Density (laidover pleat)} = \frac{\pi\left(\frac{OD_{PE}}{2}\right)^2 - \pi\left(\frac{ID_{PE}}{2}\right)^2}{\pi\left(\frac{OD_{PE}}{2}\right)^2}$$

which may be rearranged as simply:

$$\text{Area Density (laidover pleat)} = \frac{OD_{PE}^2 - ID_{PE}^2}{OD_{PE}^2}$$

Applying the above formula, a pleated tubular porous element (PE) arranged in a laid-over pleat configuration with an inner diameter (ID) of 2.54 cm and an outer diameter (OD) of 7.62 cm will have an area density of about 89%.

The advantages of laid-over pleat embodiments may be further enhanced by utilizing the flow member configurations which abut against the housing as shown, for example, in FIGS. 1–14. These embodiments may include a fluid flow member (e.g., a cage or outer porous member) with a relatively small cross sectional area and which includes channels having a low edge-wise flow resistance. Where the fluid flow member 45 abuts against the housing, the housing provides support for the fluid flow member 45 against outwardly directed forces. Hence, the flow element 45 can be made thinner since part of the structural support is provided by the housing 2. Even though the flow element 45 may abut against both the housing and the porous element, axial flow remains relatively unrestricted due to the grooves 29. Accordingly, the fluid flow member may comprise a relatively small cross-sectional area with respect to the total cross-sectional area within the housing even while having a relatively high density of perforations. This has significant advantages in maximizing the amount of filtration area and minimizing the hold-up volume for a given housing inner diameter (I.D.). For example, the percentage of the total area (or volume, assuming a constant height) of the inner diameter of the housing occupied by the porous element for a laid-over pleat configuration where the outer porous member and/or cage abuts the porous element and housing may be defined as:

$$\text{Area Density (laidover pleat)} = \frac{\pi\left(\frac{OD_{PE}}{2}\right)^2 - \pi\left(\frac{ID_{PE}}{2}\right)^2}{\pi\left(\frac{ID_{Housing}}{2}\right)^2}$$

which may be rearranged as simply:

$$\text{Area Density (laidover pleat)} = \frac{OD_{PE}^2 - ID_{PE}^2}{ID_{Housing}^2}$$

The laid-over pleat element with a cage as a fluid flow member preferably occupies at least about 60%, preferably at least about 65% or more of the area defined by the inner diameter of the housing. For example, Element A (a laid-over pleat type porous element with a cage for a fluid flow member 45) has a porous element (PE) with an inner diameter of 25 mm and an outer diameter of 76 mm, and a housing with an inner diameter of 89 mm. Applying the above formula, the area of the porous element compared to the total cross-sectional area defined by the inner diameter of the housing is about 65%.

The laid-over pleat element with an outer porous member 50 as a fluid flow member preferably occupies at least about 75%, preferably at least about 80%, more preferably at least about 85%, and most preferably between about 85% and 95% of the area defined by the inner diameter of the housing. Element B (a laid-over pleat type porous element with a outer porous member 50 for a fluid flow member 45) has a porous element with an inner diameter of 25 mm and an outer diameter of 87 mm, and a housing with an inner diameter of 89 mm. Applying the above formula, the area of the porous element compared to the total cross-sectional area defined by the inner diameter of the housing is about 87%.

FIGS. 10 and 13 show embodiments where end pieces 10a, 10b are hemispherically and/or elliptically shaped. The hemispherical and/or elliptical shape provides enhanced strength for the fluid processing apparatus 1 when employed in high-temperature applications. In high temperature applications, for fluoropolymer housings, the housing and particularly a substantially flat housing end piece may stretch and extend outwardly. This extension has been found to substantially reduce the reliability of the fluoropolymer capsule filters. However, the hemispherical or elliptical housing end piece substantially increases the structural integrity of the fluid processing apparatus, and particularly for a given end piece thickness. Further, by recessing the porous element in the end piece, the volume of the porous element within the housing is increased accordingly. Additionally, the annular region within the end pieces helps to substantially reduce the pressure drop at the outlet end by having the portion of the channels associated with the greatest pressure drop empty into a large annular region. The recessed end-pieces may still be welded in a single welding operation by utilizing a two level heater.

Figure 19:
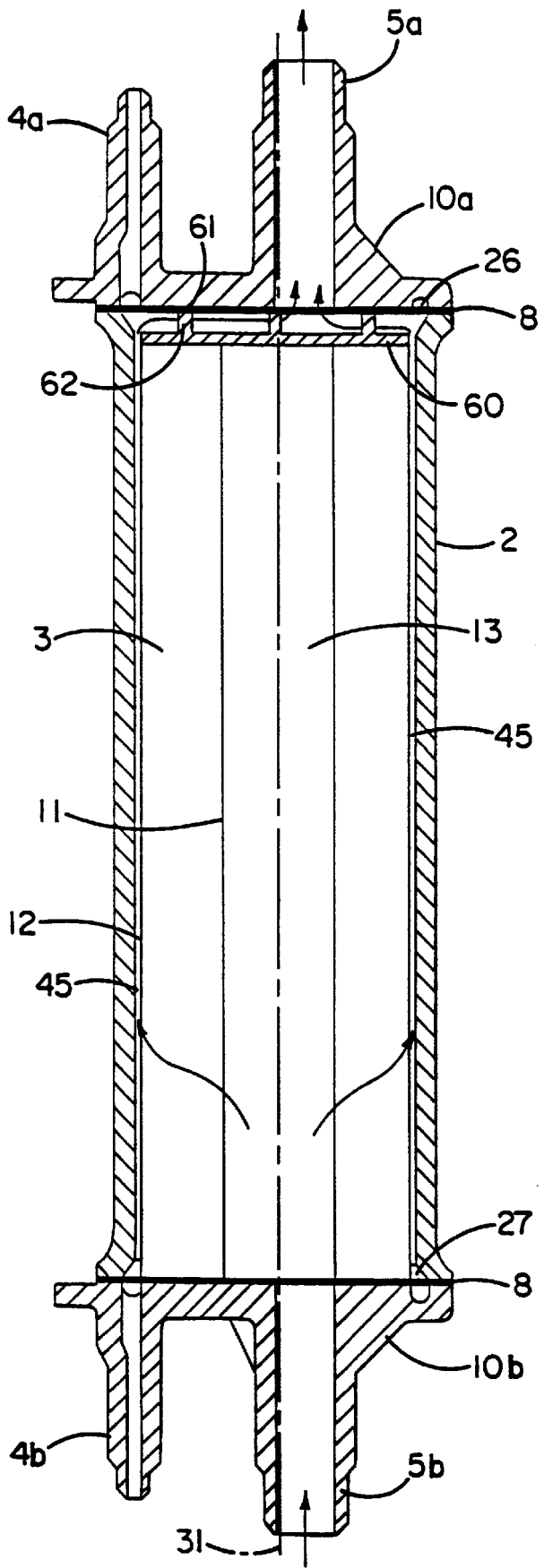
FIG. 19 shows a sectioned view of another embodiment of a fluid processing assembly.

One manufacturing concern of the aforementioned embodiments is forming a porous element with certain predetermined tolerances in order to bond the end pieces to both the porous element and the housing at both the first and second ends. Accordingly, it may be desirable in many applications to overcome this concern. For example, FIG. 19 shows another preferred embodiment of the fluid processing apparatus 1 which may include an end cap 60. Elements of the present embodiment are identified with similar reference numerals as similar elements in other embodiments. The end cap 60 is preferably first bonded to the porous element using any of the techniques discussed above. Thereafter, the porous element (including the end cap) is inserted into the housing and bonded as discussed above. The end cap preferably includes a plurality of extending pieces 62. The extending pieces preferably contact the first end piece 10a of the housing 2. The extending pieces may prevent the porous element 3 from stretching under pressure and hence substantially increase the reliability of the porous element.

In some of the most preferred embodiments, the extending pieces 62 are heated with the housing and the end piece 10a and bonded in the same operation as the sealing of the end piece 10a to the housing 2. In this manner, close tolerances need not be maintained because the heated extending pieces 62 and/or end pieces 10a deform to about exactly the correct length.

The embodiment in FIG. 19 may include a fluid flow member 45 and/or grooves in the housing as discussed above with regard to other embodiments.

As discussed above, the grooves may be tapered in thickness such that the grooves gradually increase in cross section in the axial direction along the porous element. Accordingly, the groove dimensions may be matched to the fluid flow through the porous element.

For laminar flow conditions, the radial flow rate per linear foot of porous element may be approximated using Darcy's equation for radial flow:

$$Q/L = \frac{7.08 K \Delta P}{\mu \ln(OD/ID)}$$

where:

K: permeability (Darcy)

Q/L: flow rate per linear foot of porous element

ID,OD: inner and outer diameter of the porous element in the assembly $\mu$: fluid viscosity (cp)

$\Delta P$: pressure drop across the porous element (psi).

From Darcy's Equation, it can be seen that for laminar fluid flow conditions, the rate of fluid flow along the downstream surface of the porous element increases linearly with axial length. Accordingly, it is preferably to increase the cross-sectional area of the fluid flow grooves toward the outlet end. Preferably the cross-sectional area of the fluid flow grooves increases linearly and more preferably at a rate greater than a linear rate and most preferably about exponentially.

Figure 15:
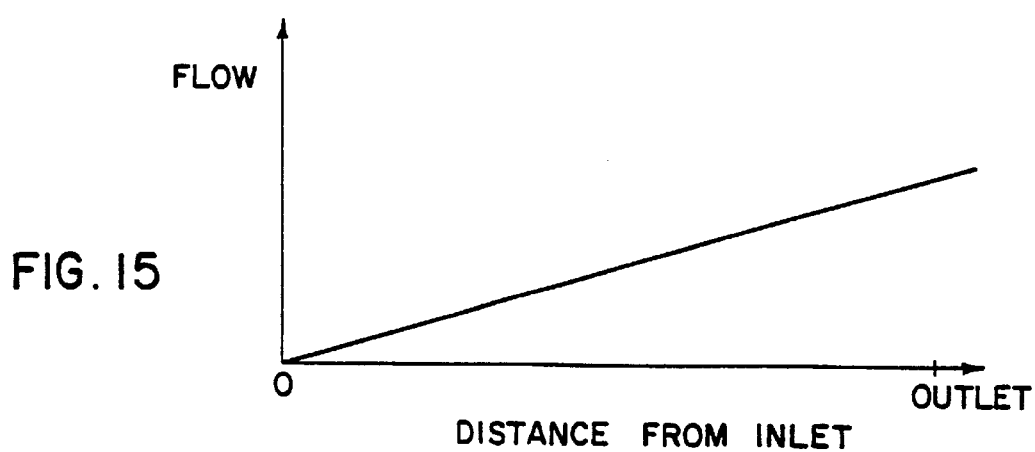
FIG. 15 shows a chart depicting radial fluid flow characteristic along the porous element in the direction of fluid flow for turbulent fluid flow.
Figure 20A:
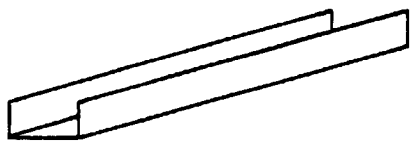
Figure 20B:
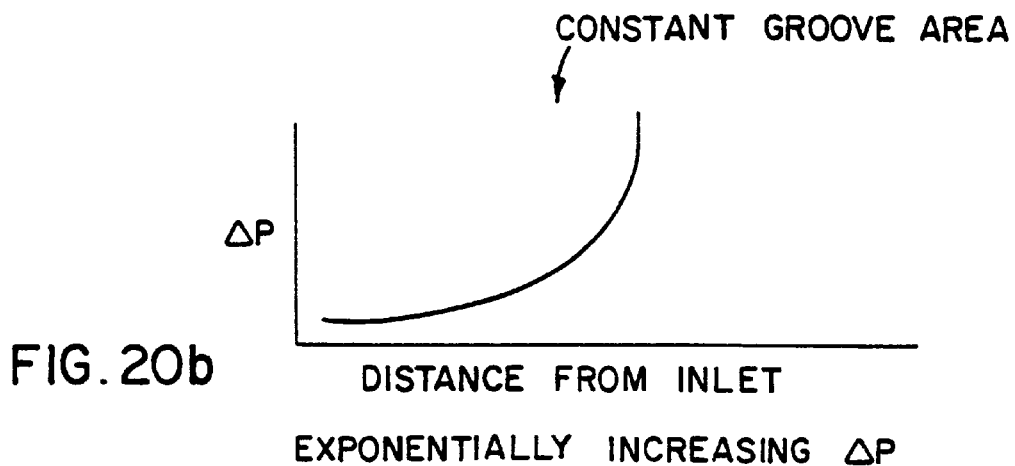

FIG. 15 shows an illustration which approximates the axial flow along the downstream surface of the porous element with increasing axial distance from the inlet. Since fluid may not be compressed, the flow increases linearly with increasing axial distance from the inlet. However, the pressure drop generated by grooves having a constant groove area increases exponentially with increasing axial length. For example, FIG. 20a shows a groove with a constant area, and FIG. 20b shows the pressure drop in the axial flow direction generated by the constant area groove.

Figure 21A:
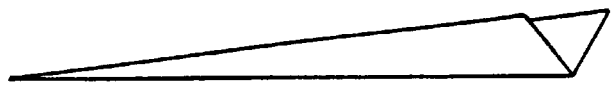
Figure 21B:
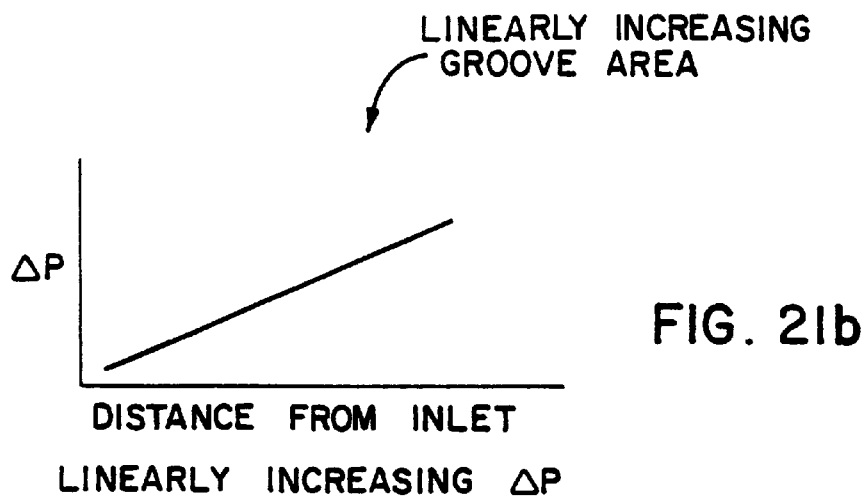

Were the cross-sectional area of the grooves increase linearly, the pressure drop associated with the groove is substantially reduced. For example, FIG. 21a shows a groove with a linearly increasing area, and FIG. 21b shows the pressure drop in the axial flow direction generated by the linearly increasing area groove.

Figure 22A:
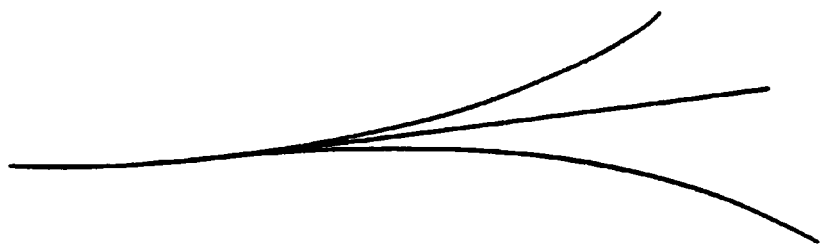
Figure 22B:
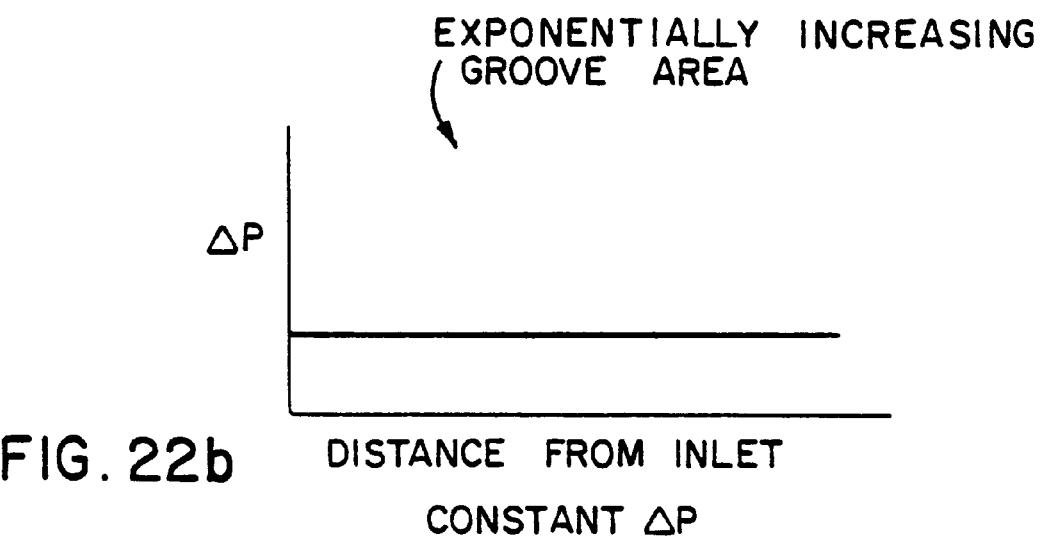

Were the cross-sectional area of the grooves increase exponentially, the pressure drop associated with the groove is substantially constant. For example, FIG. 22a shows a groove with an exponentially increasing area, and FIG. 22b shows the pressure drop in the axial flow direction generated by the exponentially increasing area groove. Note that since the groove dimensions match the pressure drop, the pressure drop associated with the grooves may be kept substantially constant. As shown in FIGS. 20–22, the pressure drop associated with the axial flow near the outlet is greatest while the pressure drop associated with the axial flow near the inlet asymptotically approaching zero.

Figure 16:
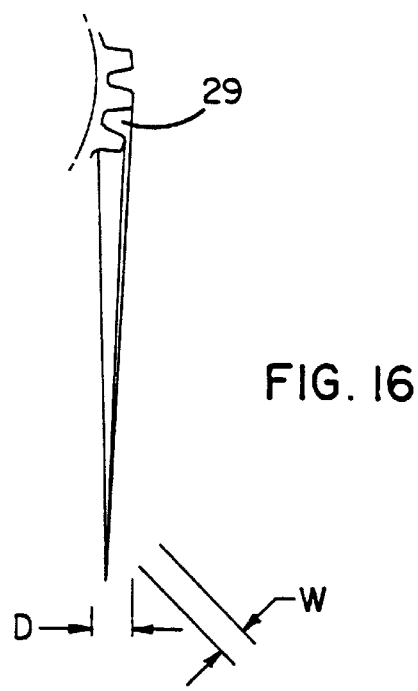
FIG. 16 shows how the cross sectional area of the grooves may be varied by varying the width and/or depth of the grooves.
Figure 17:
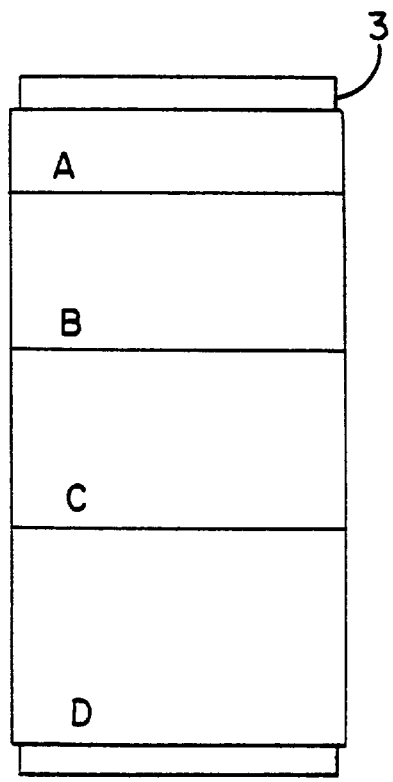
FIG. 17 shows a plurality of sleeves of the outer porous member for axially varying the cross-sectional area of the fluid flow grooves.

In order to minimize hold-up volume and pressure drop from the inlet to the outlet of the housing, it is desirable to configure the fluid flow grooves to approximate the anticipated axial flow rate of the filtrate (e.g., either linearly or more preferably exponentially). The fluid flow grooves, for example, in the housing or the cage, may be varied by any suitable mechanism such as varying the depth and/or width of the fluid flow grooves. Where an outer porous member 50 is employed to form the fluid flow grooves, the void volume and/or porosity of the outer porous member 50 may be varied either continuously or in a step-wise manner to match the fluid flow through the porous element. The void volume may be varied by any suitable mechanism including utilizing an outer porous member 50 having axially graded openings, e.g., openings which increase in size along the axial length of the housing, varying thickness or layers of the outer porous member 50, and/or by calendaring portions of the outer porous member 50. In this manner, the fluid flow grooves towards the outlet are preferably larger than the fluid flow grooves spaced from the outlet. For example, FIG. 16 illustrates an exemplary embodiment of a cage where the fluid flow grooves 29 vary linearly along the porous element. However, other variations may be preferred depending on the particular operating environment. Where turbulent fluid flow is present, the grooves may be very small away from the outlet end and relatively large near the outlet end of the housing. Further, the fluid flow grooves may be varied using one or more continuous or discontinuous steps. For example, FIG. 17 shows an outer porous member employing four outer porous bands (A–D) disposed about the outer peripheral surface of the porous element 3. Each of the outer porous bands A–D preferably has a different voids volume and consequently edgewise flow resistance to approximate the anticipated axial flow rate along the porous element. Thus, by varying the cross-sectional area of the fluid flow channels in accordance with the anticipated fluid flow, the hold-up volume and pressure drop of the fluid processing assembly may be further reduced.

In operation of exemplary embodiments, the fluid may flow through the porous element either from the interior space 13 to the exterior space 14 (inside-out flow) or from the exterior space 14 to the interior space (outside-in flow). In inside-out flow, the first surface 11 is the upstream surface and the second surface 12 is the downstream surface. In outside-in flow, the first surface 11 is the down stream surface and the second surface 12 is the upstream surface. In preferred embodiments, the fluid processing apparatus is configured to accommodate inside-out flow with the first surface 11 being the upstream surface. For example, in the embodiment shown in FIG. 1, it may be desirable to configure the first opening 5b of the second end piece 10b as a passage to allow fluid to flow into the interior space 13 of the porous element 3. In this embodiment, the first opening 5a of the first end piece 10a may be sealed or used as a vent or bleed valve to remove gaseous phase material from the internal space of the porous element 3. Similarly, the second opening 4a of the first end piece 10a may be utilized as a passage to allow fluid to flow out of the exterior space 14. In this embodiment, the second opening 4b of the second end piece 10b may be sealed or used as a vent or bleed valve to bleed gaseous phase material from the exterior space 14 between the porous element 3 and the housing 2. In some applications, the first opening 4a of the first end piece 10a may be utilized as a concentrate or retentate outlet for cross flow applications to return fluid to a source tank (not shown) when the system is started up. Similarly, the second opening 4b of the second end piece 10b may be coupled to the source tank such that fluid at start-up is recycled back to the source tank.

In preferred embodiments, the fluid enters the fluid processing apparatus 1 adjacent to the second end portion 23 of the housing 2 through the first opening 5b in the second end piece 106. The fluid flows axially along the interior space 13 of the porous element 3 towards the first end portion 22 of the housing 2. From the interior space 13, the fluid flows laterally or radially through the porous element 3 and into the exterior space and the grooves/passages of the housing and/or the flow member. The grooves/passages then direct the fluid axially along the housing 2 and the porous element towards the first end portion 22. The fluid exits the grooves/passages 29 and enters the annular channel 26 at the first end portion 22 of the housing 2. The fluid from each of the plurality of grooves/passages 29 flows together in the channel 26 and then flows out the second opening 4a in the first end piece 10a.

In an exemplary manufacturing method, the housing 2, porous element 3, and the optional core 31 as well as the flow member may be formed using well known techniques as discussed above. After the formation, the porous element 3 may be inserted into the housing 2 and the end pieces 10a, 10b may be joined to the housing 2 and the porous element 3 in multiple steps or preferably a single step. The single bonding operation can be performed contemporaneously for both the first and second end pieces 10a, 10b. As discussed above, the single step assembly process is highly advantageous over prior art fluid processing apparatuses which required several successive assembly steps. For example, the single step assembly process reduces manufacturing costs and increases reliability of the fluid processing apparatus 1.

In alternative embodiments, it may also be desirable to include a core 31 and/or to bond the core 31 to the end pieces 10a, 10b in the same step that the end pieces 10a, 10b are bonded to the housing 2. Further, where a flow member is included, it may be desirable to bond the flow member to the end pieces 10a, 10b in the same step that the end pieces 10a, 10b are bonded to the tubular portion 21 of the housing 2.

In an exemplary manufacturing method, the housing 2 and porous element 3, with or without an optional core 31, may be joined to the end pieces 10a, 10b using any well known techniques. Although any bonding method which can attain a fluid-tight seal may be utilized, in preferred embodiments the end pieces 10a, 10b are welded to the housing 2 and porous element 3. The joining may be carried out by welding brought about by heat generated by spin bonding, a heated sealing member, direct electrical heating, ultrasonic heating, infrared energy heating, and/or by other means adapted to produce suitable local fusion temperatures. In preferred embodiments, infrared energy heating is utilized.

Preferably, both elements to be joined are melted such that they fuse together. It is often not desirable to form the weld by softening only one of the two elements to be joined since a cold weld of this nature may not withstand the suitable system pressures and may have a reduced reliability particularly at the point where the housing 2 is sealed to end piece 10a, 10b.

Figure 18:
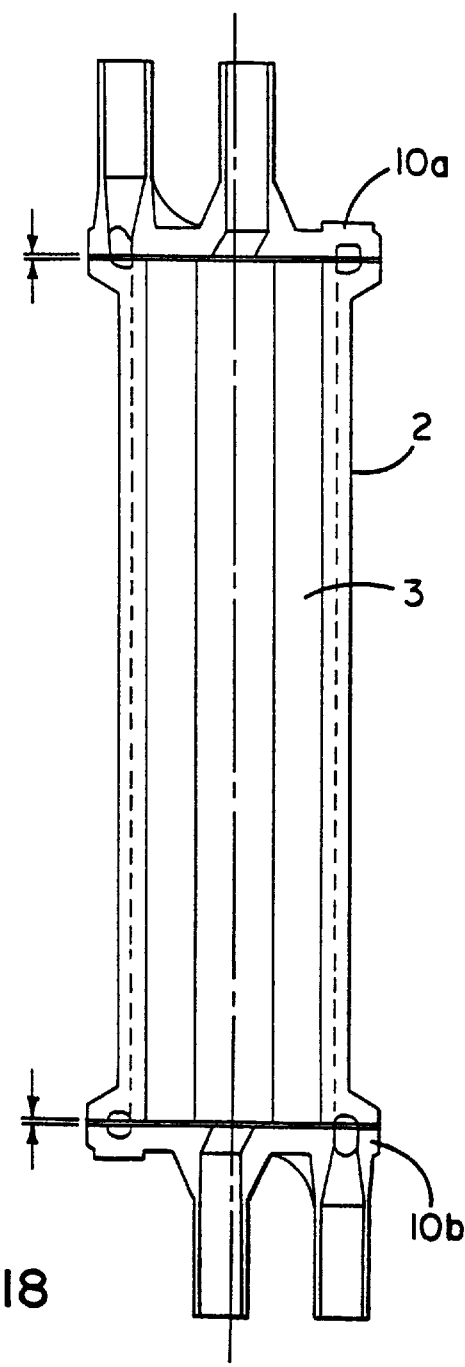
FIG. 18 shows the housing and porous element just prior to being joined to first and second end pieces.

As shown in FIG. 18, it may be desirable to urge the heated members towards each other using any suitable mechanism. It may also be desirable to taper the end portions of the housing 2 and the end pieces 10a, 10b at the point of welding so that, after the welding operation, the weld bead 8 does not extend beyond the outer periphery of the housing 2 and/or end pieces 10a, 10b.

The components of the fluid processing apparatus 1 may be produced from any suitable material which is compatible with the fluid being filtered and which can withstand the fluid pressure during filtering. Preferably, the material is commercially available. The components may be formed, for example, from polymers such as polyolefins, polyesters, polyamides, polyurethanes, polysulfones, and fluoropolymers such as polyvinylidene fluoride, polytetrafluoroethylene, and perfluoroalkoxy resins. Particularly preferred are fluoropolymers such as perfluoroalkoxy resins (PFA), polytetrafluoroethylene (PTFE), FEP (fluorinated ethylene-propylene), PVDF (polyvinylidene fluoride), and ECTFE (ethylene chlorotrifluoroethylene).

In a preferred fluid processing apparatus 1, the housing 2, porous element 3, end pieces 10a, 10b, flow member 45, and core 31 are formed from a fluoropolymer for compatibility with chemical processes such as filtration of acids (e.g., sulfuric, phosphoric and hydrochloric acids), solvents including solvent based mixtures and/or etching solutions. If a fluoropolymer is utilized, the preferred welding technique is a radiant welding technique, and the preferred molding technique is an injection molding technique. The use of an injection molded fluoropolymer housing, radiant welded end pieces, pleated porous element, and substantially reduced wetted surface area of the present invention results in substantially reduced levels of extractables.

Where a fluoropolymer mesh is utilized, it is preferable to utilize a nickel plated or Hastelloy (TM) dyes in the extruding machine to minimize the level of extractables in the extruded mesh. Further, the porous element or mesh may be washed or bleached during manufacturing to further reduce the levels of extractables.

The fluid processing apparatus 1 of the present invention may be utilized in any application where fluid filtration is required. The fluid processing apparatus according to the present invention is particularly advantageous when used in the filtration of fluids in the electronics industry where low extractables are desirable. Additionally, the fluid processing apparatus is advantageous for filtering of pharmaceutical, parenteral, and/or biological fluids where both low extractables and/or low hold-up volumes are preferred.

While several exemplary fluid processing assemblies embodying aspects of the present invention have been shown, it will be understood, of course, that the invention is not limited to these embodiments. Modification may be made by those skilled in the art, particularly in light of the foregoing teachings. For example, components and features of one embodiment may be substituted for corresponding components and features of another embodiment. Further, the invention may include various aspects of these embodiments in any combination or sub-combination.

For example, one of the end pieces may be eliminated by using a cup-shaped housing. In this embodiment, one of the end pieces may be formed integrally with the tubular portion of the housing when the housing is formed. The porous element and/or the flow member may then be welded to the interior of the housing using a extended heating element which extends into the housing. However, forming one of the end pieces integrally with the housing is not preferred because this configuration may require a first assembly step of bonding the porous element and/or the flow member to the housing and then a second assembly step of bonding the end piece to the housing and the porous element and/or the flow member. Additionally, placing the porous element into the heated housing without contacting the sides may be difficult.

Further, the second opening may be disposed in the housing rather than in the end piece. However, this embodiment may require an additional mold or machining step.

Additionally, the first and second end pieces need not be identical. For example, in some embodiments it may be desirable to use a first end piece having at least two second openings and a second end piece having only a single second opening.

It is, therefore, intended that the appended claims cover any such modifications, and sub-combinations which incorporate the features of embodiments of this invention or encompass the true spirit and scope of the invention.

We claim:

1. An apparatus for use in processing fluids comprising:
   a tubular porous element having first and second end surfaces and interior and exterior surfaces extending between the first and second end surfaces;
   a housing including an inlet and an outlet and defining a fluid flow path between the inlet and the outlet, the tubular porous element being disposed across the fluid flow path, wherein the housing includes a non-perforated tubular housing portion having first and second end surfaces and an interior surface disposed about the tubular porous element, and first and second housing end pieces respectively sealed to both the first and second end surfaces of the tubular housing portion and the first and second end surfaces of the tubular porous element to form fluid tight seals; and
   a plurality of fluid flow grooves or passages disposed between the housing and the porous element and extending from about the first end surface to about the second end surface of the porous element.

2. The apparatus of claim 1 wherein the interior surface of the housing is disposed surrounding and supporting the exterior surface of the tubular porous element and wherein the interior surface of the housing includes the fluid flow grooves or passages.

3. The apparatus of claim 1 wherein at least one of the first and second end pieces has an annular channel and wherein the annular channel fluidly communicates between the fluid flow grooves or passages and the outlet.

4. The apparatus of claim 1 wherein the housing includes a flange disposed at the first end surface, the flange including an annular channel fluidly communicating with the plurality of fluid flow grooves or passages.

5. The apparatus of claim 1 further comprising a cage or wrap disposed around the tubular porous element and having a plurality of protrusions defining the fluid flow grooves or passages.

6. An apparatus for use in processing fluids comprising:
   a tubular porous element having first and second ends;
   a housing disposed about the tubular porous element;
   fluid flow grooves or passages disposed between the tubular porous element and the housing and extending substantially between the first and second ends of the tubular porous element, wherein the fluid flow grooves or passages are tapered such that the grooves or passages increase in cross section in the direction of fluid flow.

7. The apparatus of claim 6 wherein the tubular porous element has an exterior surface and the housing includes first and second ends and an interior surface extending between the first and second ends, wherein the interior surface of the housing includes the fluid flow grooves or passages, and wherein the interior surface of the housing is disposed surrounding and supporting the exterior surface of the tubular porous element.

8. The apparatus of claim 6 wherein the housing includes first and second end pieces, at least one end piece having an annular channel which provides fluid communication between the fluid flow grooves or passages and a fluid outlet.

9. The apparatus of claim 6 wherein the housing includes a flange and wherein the flange includes an annular channel fluidly communicating with the plurality of fluid flow grooves or passages.

10. The apparatus of claim 6 further comprising a cage or wrap disposed around the tubular porous element and having a plurality of protrusions defining the fluid flow grooves or passages.

11. An apparatus for use in processing fluids comprising:
    a tubular porous element including first and second ends and a plurality of longitudinally extending pleats extending between the first and second ends, the tubular porous element having an inner diameter d and an outer diameter D, wherein each of the pleats has a height greater than $(D-d)/2$;
    a housing having a tubular portion and first and second ends, the housing extending between first and second ends of the tubular porous element and being disposed about the tubular porous element;
    a plurality of fluid flow grooves or passages extending between the first and second ends of the tubular porous element and being disposed between the housing and the tubular porous element;
    a first end piece sealed directly to the housing and to the tubular porous element at the respective first ends; and
    a second end piece sealed directly to the housing and to the tubular porous element at the respective second ends.

12. The apparatus of claim 11 including an inlet in fluid communication with an interior surface of the tubular porous element and an outlet in fluid communication with the fluid flow grooves whereby fluid flows through the inlet, through the porous element, through the fluid flow grooves and out the outlet.

13. The apparatus of claim 12 including an annular channel disposed at the second end of the housing in fluid communication with the outlet and the fluid flow grooves whereby fluid may flow from each of the fluid flow grooves into the annular channel and then through the outlet.

14. The apparatus of claim 11 wherein the housing includes an interior surface extending between the first and second ends, wherein the interior surface includes the plurality of fluid flow grooves or passages, and wherein the interior surface of the housing is disposed surrounding and supporting an exterior surface of the tubular porous element.

15. The apparatus of claim 11 wherein at least one of the first and second end pieces have an annular channel which provides fluid communication between the fluid flow grooves or passages and a fluid outlet.

16. The apparatus of claim 11 wherein the housing includes a flange disposed at the first end and the flange includes an annular channel fluidly communicating with the plurality of fluid flow grooves or passages.

17. The apparatus of claim 11 further comprising a cage or wrap disposed around an exterior of the tubular porous element and having a plurality of protrusions defining the plurality of flow grooves or passages.

* * * * *